(12) United States Patent
Furukawa et al.

(10) Patent No.: US 11,345,242 B2
(45) Date of Patent: May 31, 2022

(54) VEHICLE DRIVE SYSTEM

(71) Applicant: Mazda Motor Corporation, Hiroshima (JP)

(72) Inventors: Akihiro Furukawa, Aki-gun (JP); Seiyo Hirano, Aki-gun (JP); Hideki Sanai, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 224 days.

(21) Appl. No.: 16/882,778

(22) Filed: May 26, 2020

(65) Prior Publication Data

US 2020/0376967 A1 Dec. 3, 2020

(30) Foreign Application Priority Data

Jun. 3, 2019 (JP) .............................. JP2019-103841

(51) Int. Cl.
| | |
|---|---|
| *H02P 1/00* | (2006.01) |
| *H02P 3/00* | (2006.01) |
| *H02P 5/00* | (2016.01) |
| *B60L 50/40* | (2019.01) |
| *B60L 53/20* | (2019.01) |
| *B60L 50/60* | (2019.01) |
| *B60L 53/55* | (2019.01) |
| *B60K 6/28* | (2007.10) |
| *H02J 1/10* | (2006.01) |

(52) U.S. Cl.
CPC ................ *B60L 50/40* (2019.02); *B60K 6/28* (2013.01); *B60L 50/60* (2019.02); *B60L 53/20* (2019.02); *B60L 53/55* (2019.02); *H02J 1/102* (2013.01)

(58) Field of Classification Search
CPC .......... B60L 50/40; B60L 50/60; B60L 53/20; B60L 53/55; B60K 6/28
USPC ........................................................ 318/139
See application file for complete search history.

(56) References Cited

U.S. PATENT DOCUMENTS

| | | | | |
|---|---|---|---|---|
| 6,140,800 A | * | 10/2000 | Peterson ............... | H02J 7/0018 320/128 |
| 6,222,344 B1 | * | 4/2001 | Peterson ............... | H02J 7/0014 320/119 |
| 2014/0340039 A1 | * | 11/2014 | Lee ........................ | H02J 7/02 320/109 |
| 2021/0388805 A1 | * | 12/2021 | Miyake .................. | F02P 3/0442 |

FOREIGN PATENT DOCUMENTS

JP          2015-136263 A          7/2015

* cited by examiner

*Primary Examiner* — Erick D Glass
(74) *Attorney, Agent, or Firm* — Xsensus LLP

(57) ABSTRACT

A vehicle drive system includes: a power supply in which a battery and a capacitor are connected in series; a primary drive motor to which a voltage of the battery is provided; secondary drive motors to each of which a total voltage (Vin) of the battery and the power supply capacitor is provided; a charging circuit; and a control circuit that controls charging/discharging of the power supply. The control circuit operates switches SW1, SW2 of the charging circuit so as to control charging/discharging of the battery and the capacitor.

19 Claims, 15 Drawing Sheets

VEHICLE DRIVE SYSTEM

CROSS-REFERENCE TO RELATED APPLICATION

The present application claims priority to JP 2019-103841, filed Jun. 3, 2019, the entire contents of which are incorporated herein by reference.

TECHNICAL FIELD

The present disclosure relates to a vehicle drive system and, in particular, to a vehicle drive system that supplies plural power supply voltages, magnitudes of which differ, for travel of a vehicle in order to drive the vehicle.

BACKGROUND ART

A vehicle control circuit is described in JP-A-2015-136263 (Patent document 1). This vehicle control circuit includes: a generator that is driven by an engine; a battery that supplies power to electrical loads; a capacitor that is connected in parallel with the battery; and a DC/DC converter. This circuit is also provided with a 12-V power line connected to the battery and a 25-V power line connected to the capacitor. The DC/DC converter is provided between these two power lines.

In the circuit described in Patent document 1, the 12-V power line and the 25-V power line supply the power to respective electrical loads. The capacitor is charged by the generator during travel of a vehicle. In addition, in this circuit, the DC/DC converter can convert the power supplied from the 25-V power line to 12-V power, and can supply the 12-V power to the 12-V power line.

PRIOR ART DOCUMENTS

Patent Documents

[Patent document 1] JP-A-2015-136263

SUMMARY

Problems to be Solved

However, as recognized by the present inventors, the vehicle control circuit in Patent document 1 simply supplies two power supply voltages, which correspond to voltages of the capacitor and the battery and magnitudes of which differ, to the on-board electrical loads. Thus, in the case where higher voltage power supply is requested for driving the vehicle, another power storage device (for example, a capacitor having a higher maximum voltage (withstand voltage) or another battery having a higher rated voltage) is adopted. Such a change produces problems of increased vehicle weight, increased cost, and increased circuit complexity, which in turn lows system reliability Therefore, one aspect of the present disclosure has a purpose of providing a vehicle drive system that is lightweight, has a simple configuration, and supplies plural magnitudes of power supply voltages for travel of a vehicle.

Means for Solving the Problems

In order to solve the above-described and other problems, the present disclosure describes a vehicle drive system that is mounted on a vehicle, and includes: a power supply including a rechargeable battery and a capacitor that are connected in series; a first vehicle drive motor to which a total aggregate voltage of the rechargeable battery and the capacitor is provided; a second vehicle drive motor to which a voltage of the rechargeable battery is provided; a charging circuit connected to the power supply; and a control circuit that controls charging/discharging of the power supply via the charging circuit, wherein the charging circuit includes: a first coil, a second coil, an iron core that magnetically couples the first coil and the second coil, a first switch that electrically connects/disconnects the first coil and the capacitor, and a second switch that electrically connects/disconnects the second coil and the battery, wherein the control circuit is configured to respectively set switch states of the first switch and the second switch so as to control charging/discharging of the rechargeable battery and the capacitor.

According to the present disclosure that is configured as described above, the power supply includes series connection between the battery and the capacitor, and also includes: a first power line connected to the capacitor; and a second power line connected to the battery. The first power line and the second power line can provide different power supply voltages. The second vehicle drive motors are driven by the first power line, and the first drive motor is driven by the second power line. Just as described, in the present disclosure, it is possible to supply the plural power supply voltages with the easy and simple configuration. In addition, in the present disclosure, the power supply is constructed of the series connection of the battery and the capacitor. Thus, the charging circuit can have the simple configuration of the two electrical switches and the two coils (inductors). With opening/closing of these two electrical switches, the control circuit can easily charge/discharge electric charges between the battery and the capacitor.

In the present disclosure, preferably, a rated voltage of the power supply capacitor is higher than a rated voltage of the battery. According to the present disclosure that is configured as described above, in the case where the power supply is charged by an external power supply and the rated voltage of the battery is lower than a lower limit voltage of the external power supply, the power supply capacitor, the rated voltage of which is higher than that of the battery, is connected to the battery in series. In this way, it is possible to easily maintain an input voltage value of the vehicle to be higher than the lower limit voltage.

In the present disclosure, preferably, an end of the capacitor is connected to a positive electrode terminal of the battery, a first series circuit of the first coil and the first switch is connected in parallel with the capacitor, a second series circuit of the second coil and the second switch is connected in parallel with the battery, the first series circuit and the second series circuit are connected in series at a connection point, and the connection point is connected to the positive electrode terminal of the battery.

In the present disclosure, preferably, the control circuit controls the charging circuit to repeat for plural times: a first stage at which the first switch is brought into a closed state and the second switch is brought into an open state so as to store some of energy stored in the capacitor in the first coil; and a second stage at which the first switch is brought into the open state and the second switch is brought into the closed state so as to release the energy stored in the first coil to the battery via the second coil and charge the battery. According to the present disclosure that is configured as described above, the electric charges of the capacitor are released to the battery via the charging circuit. In this way, the battery can be charged. At this time, for example, charging power is supplied from the external power supply to the capacitor. In this way, the battery and the power supply capacitor can substantially simultaneously be charged by the external power supply.

In the present disclosure, preferably, the control circuit controls the charging circuit to repeat for plural times: a third stage at which the first switch is brought into the open state and the second switch is brought into the closed state so as to store some of energy stored in the battery in the second coil; and a fourth stage at which the first switch is brought into the closed state and the second switch is brought into the open state so as to release the energy stored in the second coil to the capacitor via the first coil and charge the capacitor. According to the present disclosure that is configured as described above, the electric charges of the battery are released to the capacitor via the charging circuit. In this way, the capacitor can be charged.

In the present disclosure, preferably, the power supply capacitor is configured that an amount of the electric charges storable therein is smaller than an amount of the electric charges storable in the battery. According to the present disclosure that is configured as described above, in the case where the power supply capacitor is charged by the battery, the total voltage of the battery and the power supply capacitor can be boosted. Thus, in the case where the total voltage is lower than a lower limit voltage of the external power supply, external charging can be performed by boosting the total voltage.

Advantages

According to the present disclosure, it is possible to provide the vehicle drive system that is lightweight, has the simple configuration, and supplies plural magnitudes of the power supply voltages for travel of the vehicle.

MODES FOR CARRYING OUT THE DISCLOSURE

Figure 1:
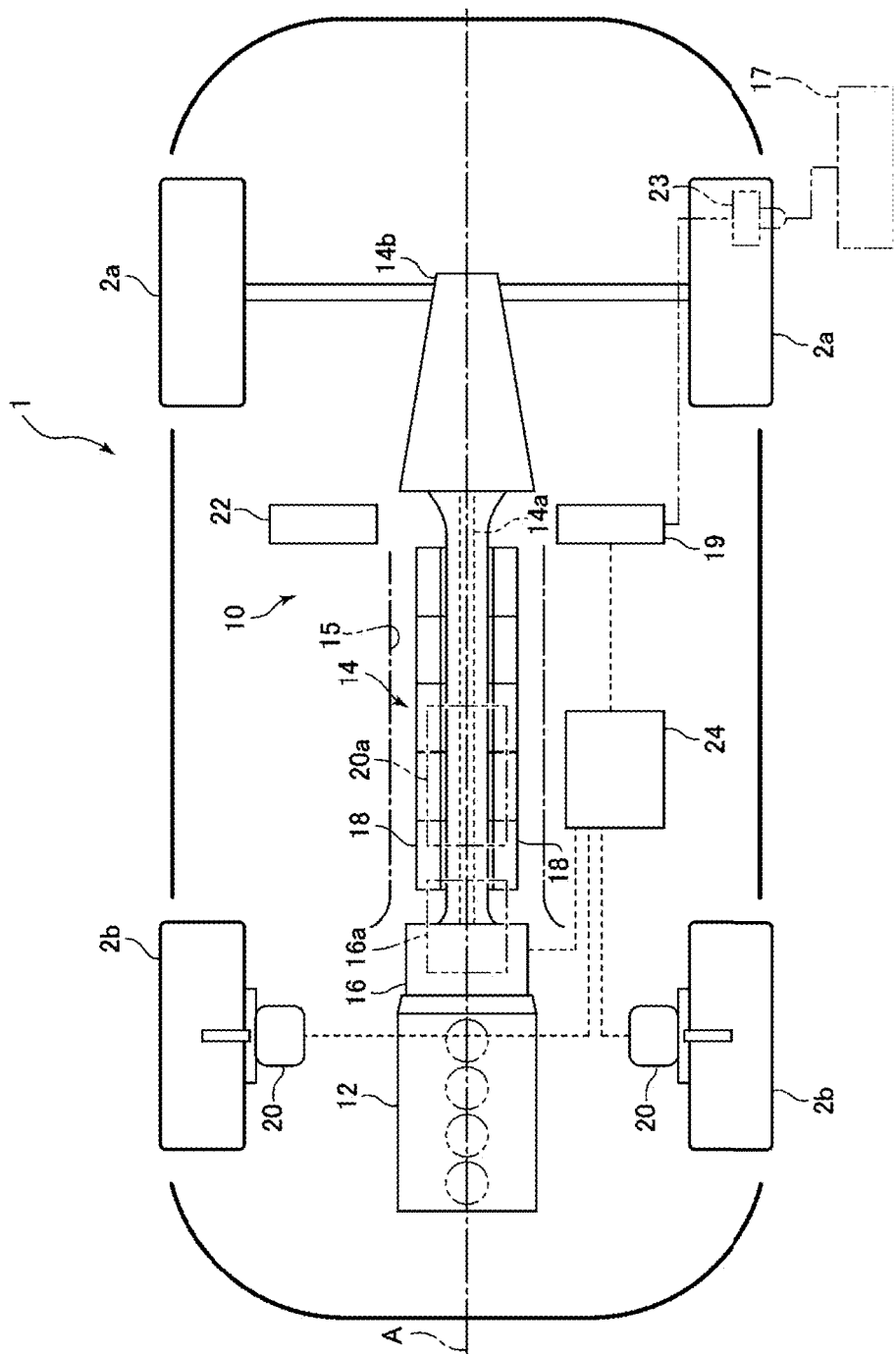
FIG. 1 is a layout view of a vehicle on which a vehicle drive system according to an embodiment of the present disclosure is mounted.
Figure 2:
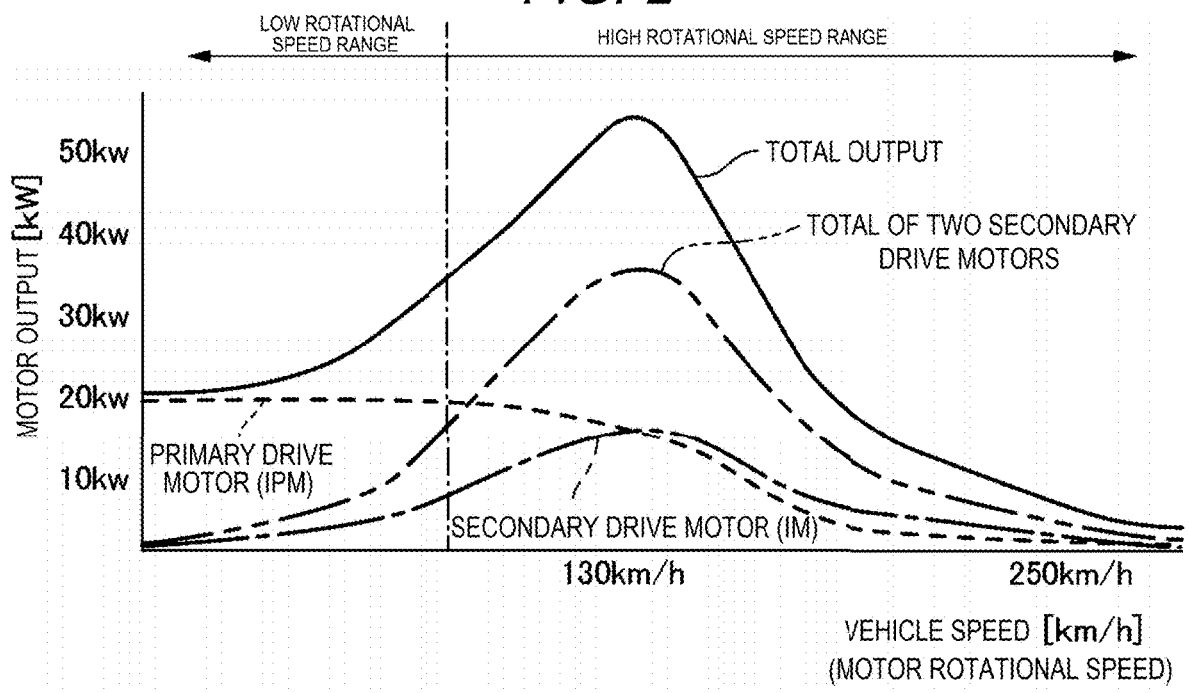
FIG. 2 is a graph illustrating a relationship between output of each motor in the vehicle drive system according to the embodiment of the present disclosure and a vehicle speed.

An embodiment of the present disclosure will be described with reference to the accompanying drawings. First, a description will be made on a configuration of a vehicle drive system according to the embodiment of the present disclosure with reference to FIG. 1 and FIG. 2. FIG. 1 is a layout view of a vehicle on which the vehicle drive system is mounted, and FIG. 2 is a graph illustrating a relationship between output of each motor in the vehicle drive system and a vehicle speed.

As illustrated in FIG. 1, a vehicle 1 on which a vehicle drive system 10 according to an embodiment of the present disclosure is mounted is a so-called front-engine, rear-drive (FR) vehicle in which an engine 12 as an internal combustion engine is mounted in a front portion of the vehicle in front of a driver's seat and a pair of right and left rear wheels 2a as primary drive wheels are driven.

The vehicle drive system 10 according to the embodiment of the present disclosure includes: a primary drive motor 16 that drives the pair of rear wheels 2a; secondary drive motors 20 that drive a pair of front wheels 2b; a power supply 3 (a battery 18 and a power supply capacitor 22) that supplies power to these motors; a charging circuit 19; and a control circuit 24.

The engine 12 is the internal combustion engine that generates drive power for the rear wheels 2a as the primary drive wheels of the vehicle 1. In this embodiment, an in-line four-cylinder engine is adopted as the engine 12, and the engine 12, which is arranged in the front portion of the vehicle 1, drives the rear wheels 2a via a power transmission mechanism 14.

The power transmission mechanism 14 is configured to transmit the drive power, which is generated by the engine 12 and the primary drive motor 16, to the rear wheels 2a as the primary drive wheels. As illustrated in FIG. 1, the power transmission mechanism 14 includes: a propeller shaft 14a that is a power transmission shaft connected to the engine 12 and the primary drive motor 16; and a transmission 14b as a gearbox.

The primary drive motor 16 is an electric motor that generates the drive power for the primary drive wheels, is provided on a body of the vehicle 1, and is arranged adjacent to the engine 12 at a position behind the engine 12. An inverter 16a is arranged adjacent to the primary drive motor 16. This inverter 16a converts a DC voltage of the battery 18 to an AC voltage, and supplies the AC voltage to the primary drive motor 16. Furthermore, as illustrated in FIG. 1, the primary drive motor 16 is connected in series with the engine 12, and the drive power generated by the primary drive motor 16 is also transmitted to the rear wheels 2a via the power transmission mechanism 14. In this embodiment, a permanent magnet motor (a permanent magnet synchronous motor) of 25 kW that is driven at a relatively low voltage (in this embodiment, equal to or lower than 48 V) is adopted as the primary drive motor 16.

The secondary drive motor 20 is provided for each of the front wheels 2b so as to generate the drive power for the respective front wheel 2b as a secondary drive wheel. The secondary drive motor 20 is an in-wheel motor and is accommodated in a wheel rim of each of the front wheels 2b. A DC voltage of the capacitor 22 is converted to an AC voltage by an inverter 20a that is arranged in a tunnel section 15, and is supplied to each of the secondary drive motors 20. Furthermore, in this embodiment, each of the secondary drive motors 20 is not provided with a reducer as a deceleration mechanism. The drive power of each of the secondary drive motors 20 is directly transmitted to the respective front wheels 2b, and thus the wheels are directly driven. Moreover, in this embodiment, an induction motor of 17 kW that is driven at a relatively high voltage (in this embodiment, equal to or lower than 120 V) is adopted as each of the secondary drive motors 20.

Figure 3:
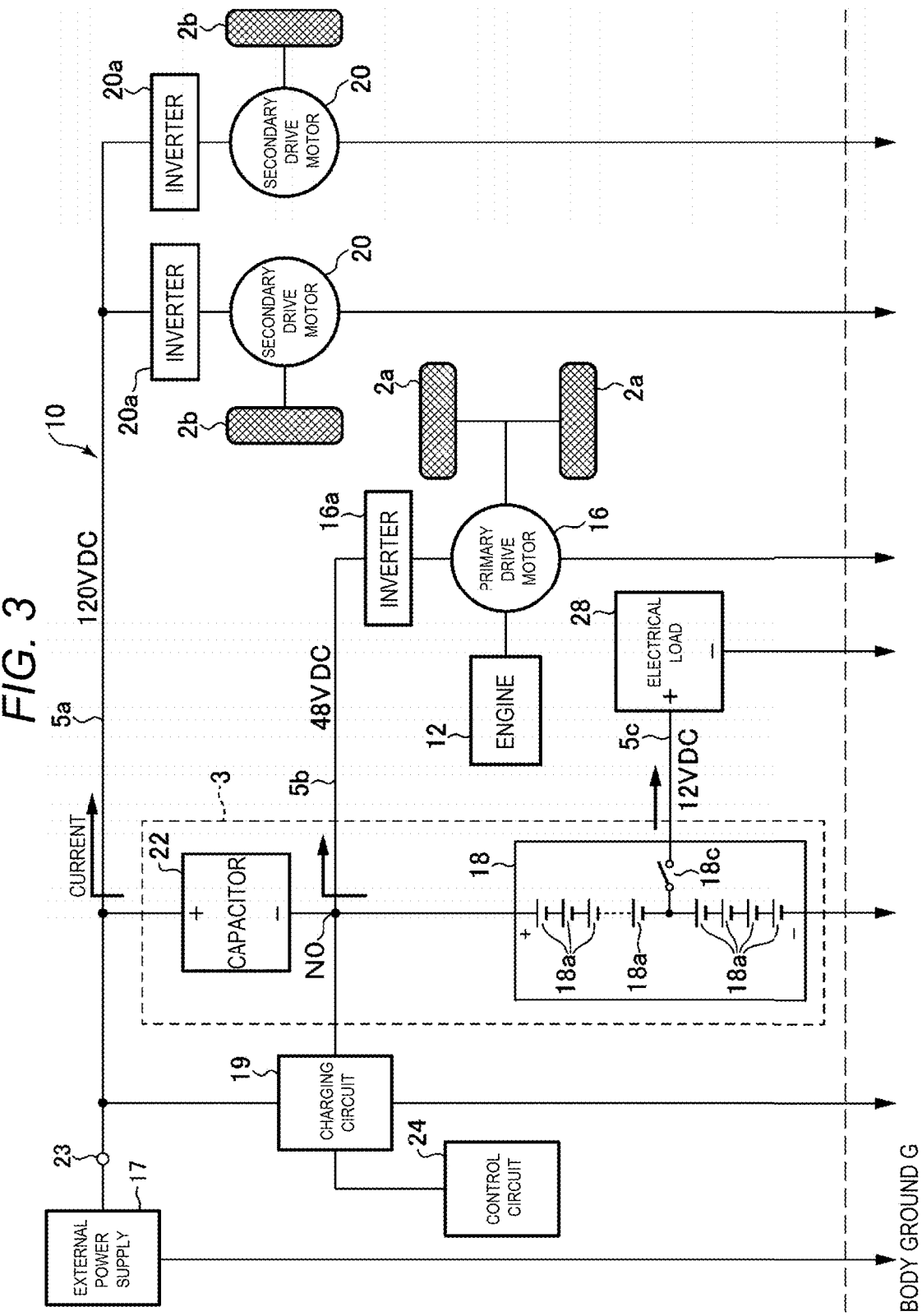
FIG. 3 is an electric block diagram of the vehicle drive system according to the embodiment of the present disclosure.

The power supply 3 is configured by connecting the battery 18 and the capacitor 22 in series (see FIG. 3). More specifically, a negative electrode terminal of the battery 18 is connected to a body ground G of the vehicle 1, and a positive electrode terminal of the battery 18 is connected to a negative electrode terminal of the capacitor 22.

The battery 18 is a power storage device that stores electrical energy for primarily actuating the primary drive motor 16. In this embodiment, a lithium-ion battery (LIB) of 48 V, 3.5 kWh is used as the battery 18. More specifically, the battery 18 is configured by connecting plural battery cells 18a (see FIG. 3) in series. In this embodiment, a rated voltage of each of the battery cells 18a is about 3 V, and 12 battery cells 18a are connected in series.

The capacitor 22 is a power storage device that supplies the power to the secondary drive motor 20 provided to each of the front wheels 2b of the vehicle 1. In a rear portion of the vehicle 1, the capacitor 22 is arranged at a substantially symmetrical position to the plug-in charging circuit 19. In this embodiment, the capacitor 22 has a withstand voltage of 72 V and electrostatic capacity of about several farads. Each of the secondary drive motors 20 is a motor that is driven at the higher voltage than the primary drive motor 16, and is primarily driven by the electrical energy stored in the capacitor 22.

The charging circuit 19 is electrically connected to the battery 18 and the capacitor 22. The charging circuit 19 is configured to charge the battery 18 and the capacitor 22 with regenerative power of the primary drive motor 16 and the secondary drive motors 20 as well as power supplied from an external power supply 17 such as a charging stand connected to a power supply port 23.

The power supply port 23 is a connector that is provided on a lateral surface in the rear portion of the vehicle 1, and is electrically connected to the charging circuit 19. The connector of the power supply port 23 is configured to be connectable to a plug of an electrical cable 17a that extends from the external power supply 17 such as the charging stand, and the power is supplied to the charging circuit 19 via the power supply port 23. Just as described, the vehicle drive system 10 in this embodiment is configured to be able to charge the battery 18 and the capacitor 22 by connecting the external power supply 17 for supplying the DC power to the power supply port 23 via the electrical cable 17a.

The control circuit 24 is configured to control the engine 12, the primary drive motor 16, and the secondary drive motors 20 so as to execute one of a motor travel mode and an internal combustion engine travel mode. The control circuit 24 is also configured to control the charging circuit 19 so as to charge/discharge the battery 18 and the capacitor 22. More specifically, the control circuit 24 can be constructed of a microprocessor, memory, an interface circuit, a program that actuates these components (none of them are illustrated), and the like. Moreover, the control circuit 24 includes one or more interconnected microprocessors that are configured by software stored in memory, and/or application specific circuits that are hardwired configured, and/or software configured to perform the processes described herein.

Next, FIG. 2 illustrates a relationship between the vehicle speed and output of each of the motors in the vehicle drive system 10. In FIG. 2, the output of the primary drive motor 16 is indicated by a broken line, the output of the single secondary drive motor 20 is indicated by a one-dot chain line, the total output of the two secondary drive motors 20 is indicated by a two-dot chain line, and the total output of all the motors is indicated by a solid line. In FIG. 2, a horizontal axis represents a speed of the vehicle 1, and a vertical axis represents the output of each of the motors. Due to a constant relationship between the speed of the vehicle 1 and a rotational speed of each of the motors, even when the motor rotational speed is set on the horizontal axis, the output of each of the motors exhibits a similar curve to that in FIG. 2.

In this embodiment, the permanent magnet motor is adopted as the primary drive motor 16. Thus, as indicated by the broken line in FIG. 2, in a low vehicle speed range where the motor rotational speed is low, the output of the primary drive motor 16 is large. Then, as the vehicle speed is increased, the motor output that can be output is reduced. More specifically, in this embodiment, the primary drive motor 16 is driven at about 48 V, outputs torque of about 200 Nm as maximum torque up to about 1000 rpm. At about 1000 rpm and higher, the torque is reduced along with an increase in the rotational speed. In addition, in this embodiment, the primary drive motor 16 is configured to enable continuous output at about 20 kW in the lowest speed range and to obtain the maximum output of about 25 kW.

Meanwhile, the induction motor is adopted as the secondary drive motor 20. Thus, as indicated by the one-dot chain line and the two-dot chain line in FIG. 2, the output of the secondary drive motor 20 is extremely small in the low vehicle speed range. As the vehicle speed is increased, the output of the secondary drive motor 20 is increased. Then, after the secondary drive motor 20 generates the maximum output near the vehicle speed of about 130 km/h, the motor output is reduced. In this embodiment, the secondary drive motor 20 is configured to be driven at about 120 V and, near the vehicle speed of about 130 km/h, generate the output of about 17 kW per motor and the total output of about 34 kW by the two motors. That is, in this embodiment, the secondary drive motor 20 has a torque curve that peaks at about 600 to 800 rpm, and generates the maximum torque of about 200 Nm.

The solid line in FIG. 2 represents the total output of these primary drive motor 16 and two secondary drive motors 20. As it is apparent from this graph, in this embodiment, the maximum output of about 53 kW is obtained near the vehicle speed of about 130 km/h. With this maximum output at this vehicle speed, a travel condition requested for the WLTP test can be satisfied. In the solid line in FIG. 2, output values of the two secondary drive motors 20 are combined in the low vehicle speed range. However, in reality, each of the secondary drive motors 20 is not driven in the low vehicle speed range. More specifically, the vehicle is driven only by the primary drive motor 16 at a start and in the low vehicle speed range, and the output of the two secondary drive motors 20 is generated only when the large output is required in the high vehicle speed range (when the vehicle 1 is accelerated in the high vehicle speed range, or the like). Just as described, the induction motors (the secondary drive motors 20) capable of generating the large output in a high rotational speed range are only used in the high speed range. Thus, while an increase in vehicle weight is restrained, sufficient output can still be obtained when necessary (during acceleration at a specified speed or higher, or the like).

Next, a description will be made on an electric configuration of the vehicle drive system 10 according to the embodiment of the present disclosure with reference to FIG. 3. FIG. 3 is an electric block diagram of the vehicle drive system.

In this embodiment, the vehicle drive system 10 is configured to supply three power supply voltages, magnitudes of which differ. More specifically, the vehicle drive system 10 is provided with: a first power line 5a for supplying the voltage of 120 V at a maximum; a second power line 5b for supplying the voltage of 48 V at a maximum; and a third power line 5c for supplying the voltage of 12 V at a maximum.

The first power line 5a is connected to a positive electrode terminal of the capacitor 22, and supplies the 120 VDC voltage to the secondary drive motors 20 via the inverters 20a. That is, with a total voltage of an inter-terminal voltage of the battery 18 and an inter-terminal voltage of the capacitor 22, a potential difference of 120 VDC at a maximum is generated between the positive electrode terminal of the capacitor 22 and the body ground G of the vehicle 1. The inverters 20a, which are connected to the respective secondary drive motors 20, convert the output of the battery 18 and the capacitor 22 to the AC voltage, and then drive the respective secondary drive motors 20 as the induction motor.

The second power line 5b is connected to the positive electrode terminal of the battery 18, and supplies the 48 VDC voltage to the primary drive motor 16 via the inverter 16a. That is, with the inter-terminal voltage of the battery 18, the potential difference of 48 VDC at the maximum is generated between the positive electrode terminal of the battery 18 and the body ground G of the vehicle 1. The inverter 16a converts the output of the battery 18 to the AC voltage, and then drives the primary drive motor 16 as the permanent magnet motor.

The third power line 5c is connected to a positive electrode terminal of a particular battery cell 18a among the plural battery cells 18a that are connected in series. More specifically, due to an in-series connection circuit of the specified number (four in this example) of the battery cells 18a, the potential difference of about 12 VDC is generated between the positive electrode terminal of this particular battery cell 18a and the body ground G of the vehicle 1. The third power line 5c is an accessory power supply, and supplies the 12 VDC voltage to an electrical load 28 of the vehicle 1 via a switch 18c. The electrical load is on-board electrical equipment (for example, an air conditioner, an audio device, or the like).

Just as described, the primary drive motor 16 is driven at about 48 V that is a reference output voltage of the battery 18. Meanwhile, since each of the secondary drive motors 20 is driven at the total voltage acquired by combining the output voltage of the battery 18 and the inter-terminal voltage of the capacitor 22, each of the secondary drive motors 20 is driven at the maximum voltage of 120 V that is higher than 48 V. The capacitor 22 stores the electrical energy to be supplied to the secondary drive motors 20, and each of the secondary drive motors 20 is always driven by the power that is supplied via the capacitor 22.

As illustrated in FIG. 3, the charging circuit 19 is connected to the positive electrode terminal of the capacitor 22, a connection point NO between the positive electrode terminal of the battery 18 and the negative electrode terminal of the capacitor 22, and the body ground G. The control circuit 24 executes charging processing of the battery 18 and the capacitor 22 by using the charging circuit 19 in specified times (during regeneration of the motor and during external charging by the external power supply 17).

The control circuit 24 monitors the voltages and currents of the first power line 5a, the second power line 5b, and the third power line 5c by using plural voltage sensors and plural current sensors, which are not illustrated. By using these voltage values and current values, the control circuit 24 further calculates the inter-terminal voltage of the battery 18 (hereinafter referred to as a "battery voltage"), the inter-terminal voltage of the capacitor 22 (hereinafter referred to as a "capacitor voltage"), and states of charge (SOC) of these.

During deceleration of the vehicle 1, or the like, the primary drive motor 16 and the secondary drive motors 20 function as generators, and regenerate kinetic energy of the vehicle 1 to generate the power. The power regenerated by the primary drive motor 16 is stored in the battery 18, and the power regenerated by each of the secondary drive motors 20 is primarily stored in the capacitor 22.

In the case where the external power supply 17 is used for charging, at the time when the external power supply 17 is connected to the power supply port 23, a charging voltage of the external power supply 17 is applied to the charging circuit 19 and the capacitor 22, which allows charging of the battery 18 and the capacitor 22.

The electrostatic capacity of the capacitor 22 is relatively small. Thus, when the capacitor 22 is charged by the regeneration of the motor or the external charging, the capacitor voltage is boosted relatively rapidly. When the capacitor voltage reaches a specified voltage by charging, the control circuit 24 controls the charging circuit 19 to charge the battery 18 by using electrostatic energy (electric charges) stored in the capacitor 22. As a result, the capacitor voltage is dropped, and thus the capacitor 22 can be charged again. By repeating such processing, the battery voltage can gradually be boosted. That is, the power regenerated by each of the secondary drive motors 20 and the power from the external power supply 17 are temporarily stored in the capacitor 22, and are then stored in the battery 18.

In general, the external power supply 17 such as the charging stand is configured to obtain the voltage of the vehicle (that is, a voltage-to-ground of the power supply port) when being connected to the power supply port of the vehicle and not to execute the charging processing for a safety reason when this voltage is lower than a specified lower limit voltage (for example, 50 V).

In this embodiment, a rated voltage (48 V) of the battery 18 is set lower than the lower limit voltage (50 V). However, the external power supply 17 obtains a total voltage of a battery voltage Vbatt and a capacitor voltage Vcap (that is, the voltage of the first power line 5a) as the voltage of the vehicle 1. Thus, in this embodiment, in the case where the total voltage is equal to or higher than the lower limit voltage, the external power supply 17 initiates the charging processing regardless of a magnitude of the battery voltage Vbatt. The control circuit 24 then controls the charging circuit 19, so as to be able to charge the battery 18 and the capacitor 22.

On the other hand, in the case where the total voltage (=Vbatt+Vcap) is lower than the lower limit voltage at the time when the external power supply 17 is connected to the power supply port 23, the external power supply 17 does not initiate the charging processing. In this case, the control circuit 24 controls the charging circuit 19, and boosts the capacitor voltage by using some of the electrical energy stored in the battery 18. At this time, since a stored electrical charge amount of the battery 18 is large, the battery voltage is hardly dropped. In this way, the total voltage can be boosted to be equal to or higher than the lower limit voltage.

Also, in a time other than the external charging (that is, during travel of the vehicle 1), in the case where the capacitor voltage becomes lower than the specified voltage due to discharging of the capacitor 22, the control circuit 24 can charge the capacitor 22 by using the power of the battery 18 prior to the power supply from the capacitor 22 to the secondary drive motors 20.

In the present specification, the rated voltage of the battery 18 means a maximum value (a full-charged voltage) of an actuation voltage under a general condition, and a rated voltage of the capacitor 22 means a maximum voltage (a full-charged voltage) set for the capacitor 22. In addition, an average actuation voltage of the battery at a time when the battery is discharged under the general condition is referred to as a nominal voltage of the battery. Furthermore, the rated voltage (48 V) of the battery 18 is set lower than the rated voltage (72 V) of the capacitor 22. However, the battery 18 is configured that an amount of the electric charges (an electrical quantity: coulomb) that can be stored therein is much larger than an amount of the electrical charges that can be stored in the capacitor 22.

Figure 4:
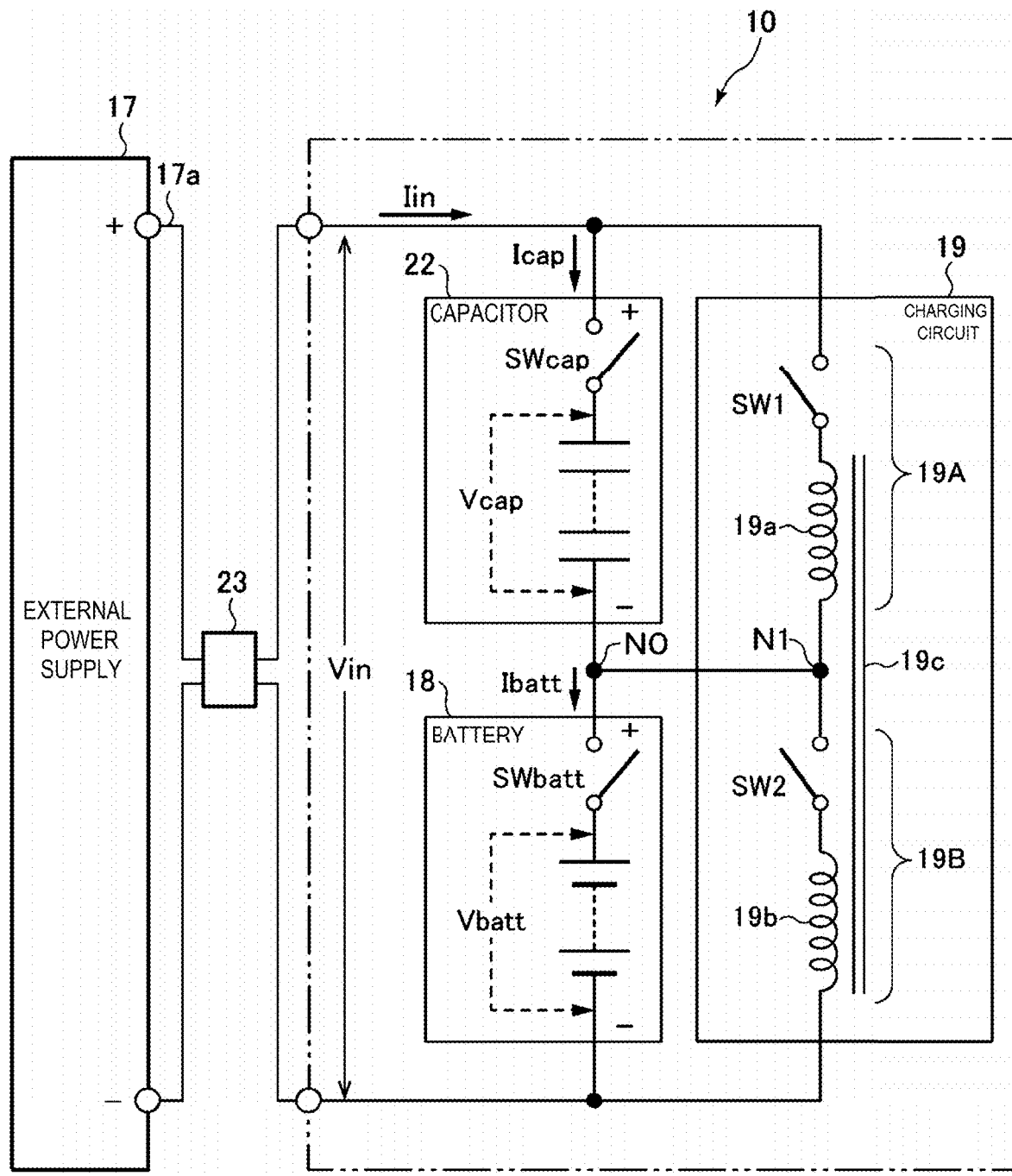
FIG. 4 is a diagram for illustrating electric circuits in a battery, a capacitor, and a charging circuit of the vehicle drive system according to the embodiment of the present disclosure.

Next, a description will be made on the charging processing of the vehicle drive system 10 according to the embodiment of the present disclosure with reference to FIG. 4 to FIG. 11. FIG. 4 is a diagram for illustrating electric circuits in the battery, the capacitor, and the charging circuit. As illustrated in FIG. 4, a switch SWbatt is connected to the positive electrode terminal of the battery 18, a switch SWcap is connected to the positive electrode terminal of the capacitor 22, and connection/disconnection of each of the battery 18 and the capacitor 22 can thereby be switched.

The charging circuit 19 is connected in parallel with the battery 18 and the capacitor 22 that are connected in series. The charging circuit 19 includes a coil(s) (an inductor) and two switches. In this embodiment, the coil has two coils 19a, 19b. A connection point N1 between the coil 19a and the coil 19b is connected to the connection point N0 between the battery 18 and the capacitor 22. Thus, one end and another end of the coil 19a are respectively connected to the positive electrode terminal and the negative electrode terminal of the capacitor 22. Meanwhile, one end and another end of the coil 19b are respectively connected to the positive electrode terminal and the negative electrode terminal (the body ground G) of the battery 18. A switch SW1 is arranged to open/close a closed circuit formed by the capacitor 22 and the coil 19a. A switch SW2 is arranged to open/close a closed circuit formed by the battery 18 and the coil 19b. In this embodiment, the switch SW1 is arranged between the positive electrode terminal of the capacitor 22 and a high-potential side terminal of the coil 19a, and the switch SW1 and the coil 19a constitute a first series circuit 19A. Meanwhile, the switch SW2 is arranged between the positive electrode terminal of the battery 18 and a high-potential side terminal of the coil 19b, and the switch SW2 and the coil 19b constitute a second series circuit 19B.

The coil 19a and the coil 19b constitute a single coil that is wound around a common iron core 19c and is substantially magnetically coupled. This coil stores the electrical energy as magnetic energy when the current flows therethrough. In this embodiment, the coil 19a and the coil 19b are configured to be wound around the iron core 19c in a specified direction and to supply the magnetic energy that is temporarily stored in the coils 19a, 19b to the outside (the capacitor 22 and the battery 18) as the electrical energy. The control circuit 24 controls opening/closing of the switches SW1, SW2, SWbatt, SWcap. In this embodiment, a semiconductor switch is adopted as each of the switches. However, a relay using a mechanical contact can also be used as each of the switches.

Figure 5:
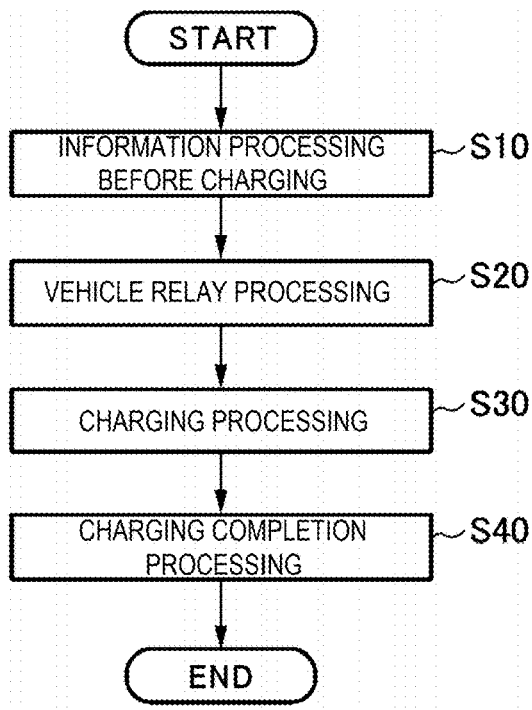
FIG. 5 is a flowchart of external charging processing executed by the vehicle drive system according to the embodiment of the present disclosure.
Figure 6:
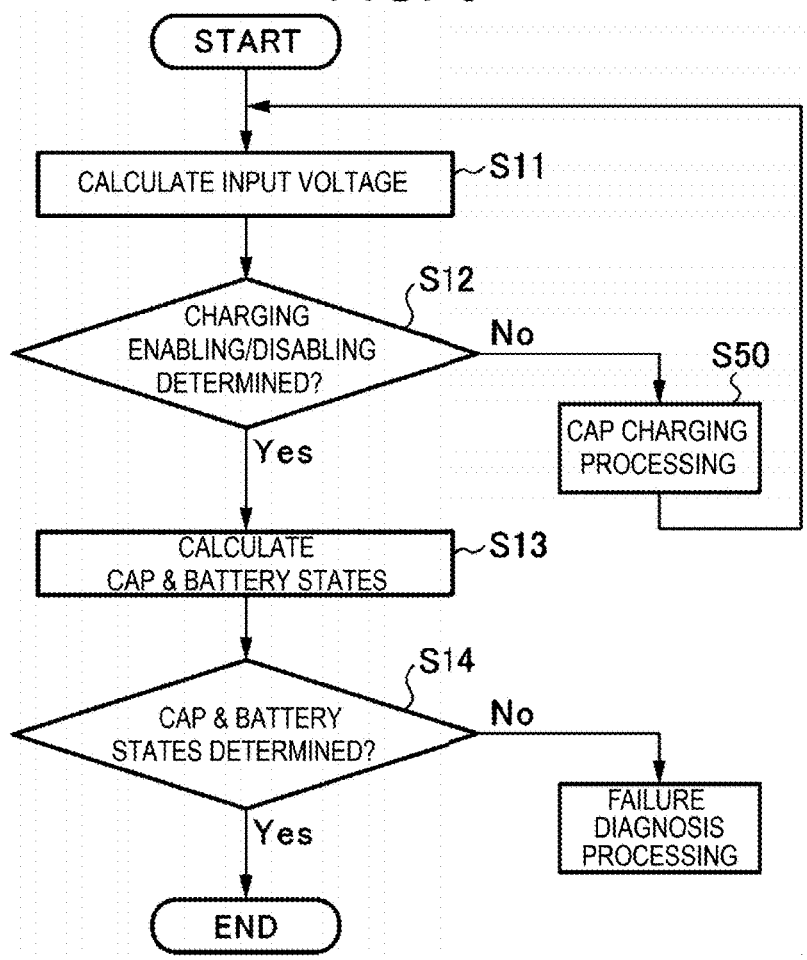
FIG. 6 is a flowchart of information processing before charging in the external charging processing executed by the vehicle drive system according to the embodiment of the present disclosure.
Figure 7:
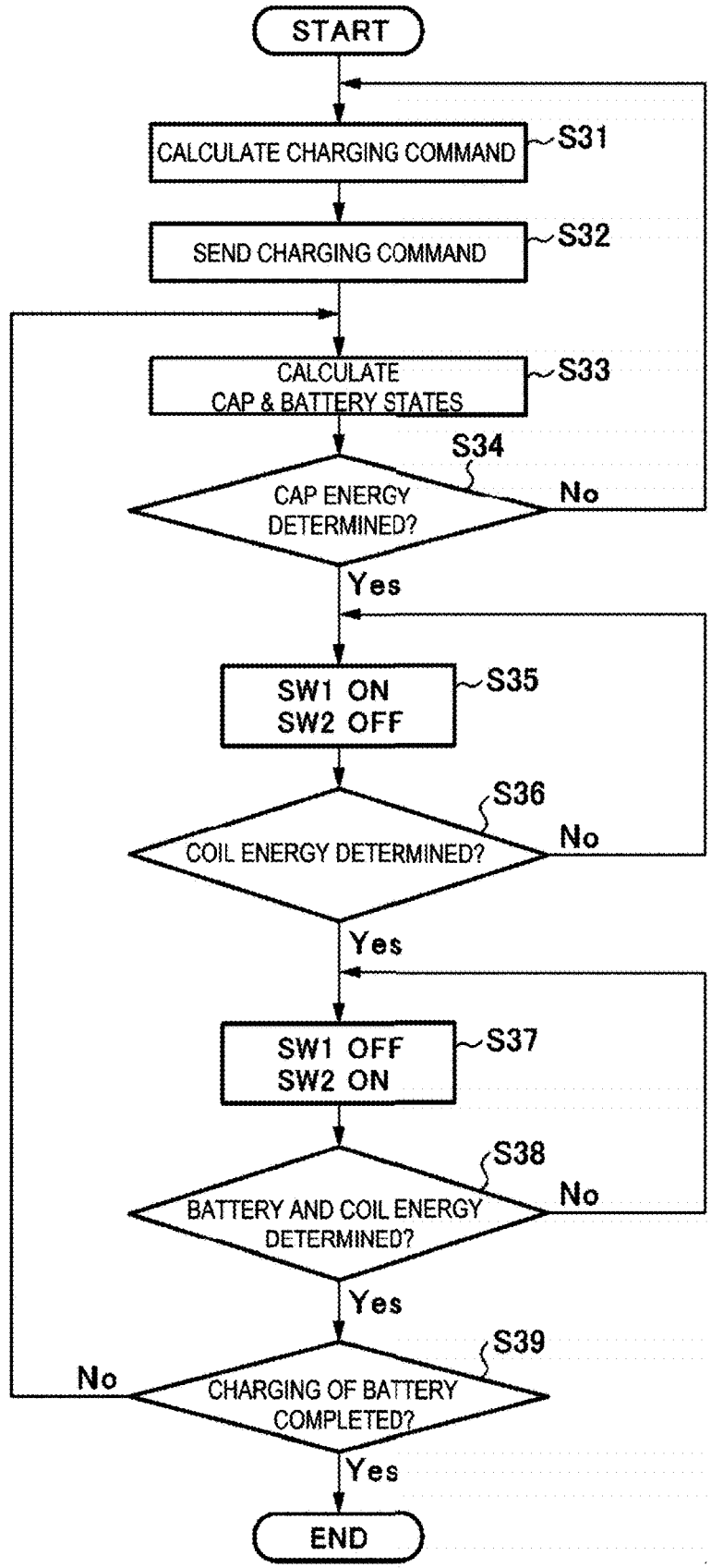
FIG. 7 is a flowchart of charging processing in the external charging processing executed by the vehicle drive system according to the embodiment of the present disclosure.
Figure 8:
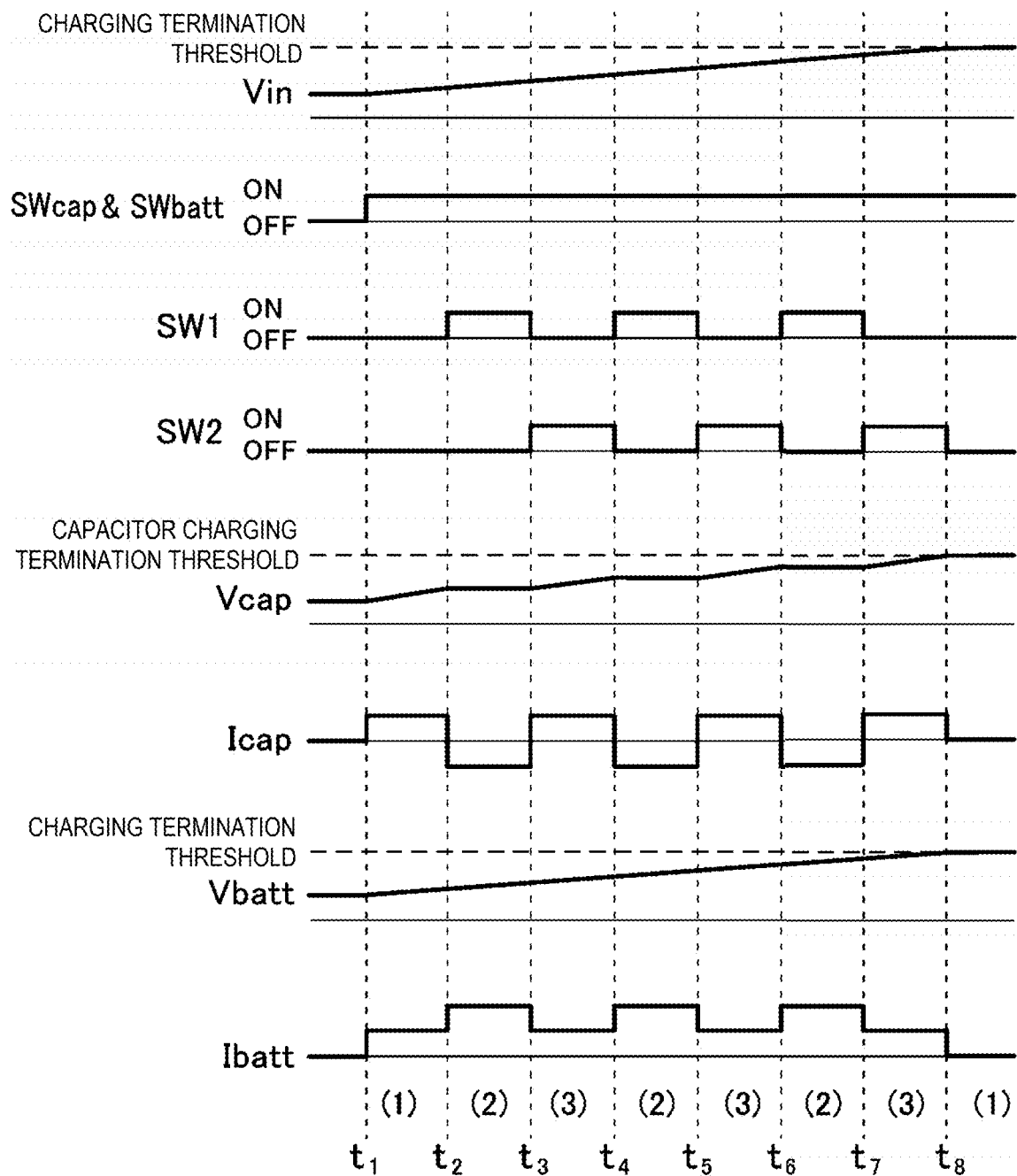
FIG. 8 includes time charts illustrating displacement of a current and a voltage during external charging executed by the vehicle drive system according to the embodiment of the present disclosure.

A description will be made on external charging processing in this embodiment with reference to FIG. 5 to FIG. 9. FIG. 5 is a flowchart of the external charging processing, FIG. 6 is a flowchart of information processing before charging in the external charging processing, and FIG. 7 is a flowchart of charging processing in the external charging processing. FIG. 8 includes time charts illustrating displacement of the current and the voltage during the external charging, and FIG. 9 includes diagrams illustrating open/closed positions of the electrical switches and the current at each stage during the external charging.

FIG. 8 illustrates an input voltage value Vin, open/closed states of the switches SWbatt, SWcap, an open/closed state of the switch SW1, and an open/closed state of the switch SW2 in an order from above. Following this, FIG. 8 illustrates the inter-terminal voltage Vcap of the capacitor 22 (the voltage between the positive electrode terminal and the negative electrode terminal of the capacitor 22), a current Icap flowing through the capacitor 22, the inter-terminal voltage Vbatt of the battery 18, and a current Ibatt flowing through the battery 18.

As illustrated in FIG. 5 (the external charging processing), when detecting that the external power supply 17 is connected to the power supply port 23, the control circuit 24 sequentially executes the information processing before charging (S10), vehicle relay processing (S20), the charging processing (S30), and charging completion processing (S40) in the external charging processing. After being connected to the vehicle 1 and a specified condition is satisfied, the external power supply 17 starts supplying the power.

As illustrated in FIG. 6 (the information processing before charging S10), the control circuit 24 first calculates an input voltage value Vin (S11). The input voltage value Vin corresponds to the voltage of the vehicle 1 observed by the external power supply 17, and specifically corresponds to the total voltage of the battery voltage and the capacitor voltage. Thus, the control circuit 24 brings the switches SWbatt, SWcap into the closed states and measures the input voltage value Vin (corresponding to the voltage of the first power line 5*a*) by using the voltage sensor. Here, instead of directly measuring the input voltage value Vin, the battery voltage Vbatt and the capacitor voltage Vcap may each be measured by the voltage sensor, and these voltage values may be added to calculate the input voltage value Vin.

Next, the control circuit 24 determines whether it is currently in a state capable of executing the charging processing (S12). More specifically, the control circuit 24 determines whether the input voltage value Vin is equal to or higher than a specified voltage. The specified voltage is an external charging initiation threshold, and is set to the voltage (for example, 55 V) that is equal to or higher than the lower limit voltage (50 V). In the case where the input voltage value Vin is lower than the specified voltage (S12; No), capacitor charging processing (S50), which will be described later, is executed, and then the processing returns to the processing in step S11. On the other hand, if the input voltage value Vin is equal to or higher than the specified voltage (S12; Yes), the control circuit 24 calculates the states of the battery 18 and the capacitor 22 (S13). That is, in this processing, the control circuit 24 measures the battery voltage Vbatt, the capacitor voltage Vcap, the battery current Ibatt, and the capacitor current Icap by using the voltage sensor and the current sensor, and obtains the SOCs of the battery 18 and the capacitor 22.

Next, the control circuit 24 determines the states of the battery 18 and the capacitor 22 (S14). In this processing, the control circuit 24 determines whether each of the battery 18 and the capacitor 22 is in a healthy state capable of being normally charged (for example, each of the battery voltage Vbatt and the capacitor voltage Vcap is equal to or higher than a set threshold, or the SOC of each thereof is equal to or higher than a set threshold). If the control circuit 24 determines that the battery 18 or the capacitor 22 is not in the healthy state (S14; No), failure diagnostic processing is executed. On the other hand, if the control circuit 24 determines that both of the battery 18 and the capacitor 22 are in the healthy states (S14; Yes), the processing is shifted to the vehicle relay processing (S20 in FIG. 5). In the vehicle relay processing, the control circuit 24 switches each of the switches SWbatt, SWcap, SW1, SW2 to an initial position (an open position).

As illustrated in FIG. 7 (the charging processing S30), the control circuit 24 first calculates a charging command for the external power supply 17 (S31), and sends the charging command to the external power supply 17 via an unillustrated communication line (S32). That is, the control circuit 24 calculates a charging current value that should be supplied from the external power supply 17 such that charging is completed in a specified charging schedule. The charging command is a signal for requesting supply of the charging current value obtained by this calculation. At this time, the control circuit 24 switches the switches SWbatt, SWcap into the closed positions. Meanwhile, the external power supply 17 also measures the input voltage value Vin of the vehicle 1 by using the voltage sensor provided in the external power supply 17. In the case where the measured input voltage value Vin is equal to or higher than the lower limit voltage, the external power supply 17 supplies charging power when receiving the charging command from the vehicle 1 (see stage (1) in FIG. 9).

Figure 9:
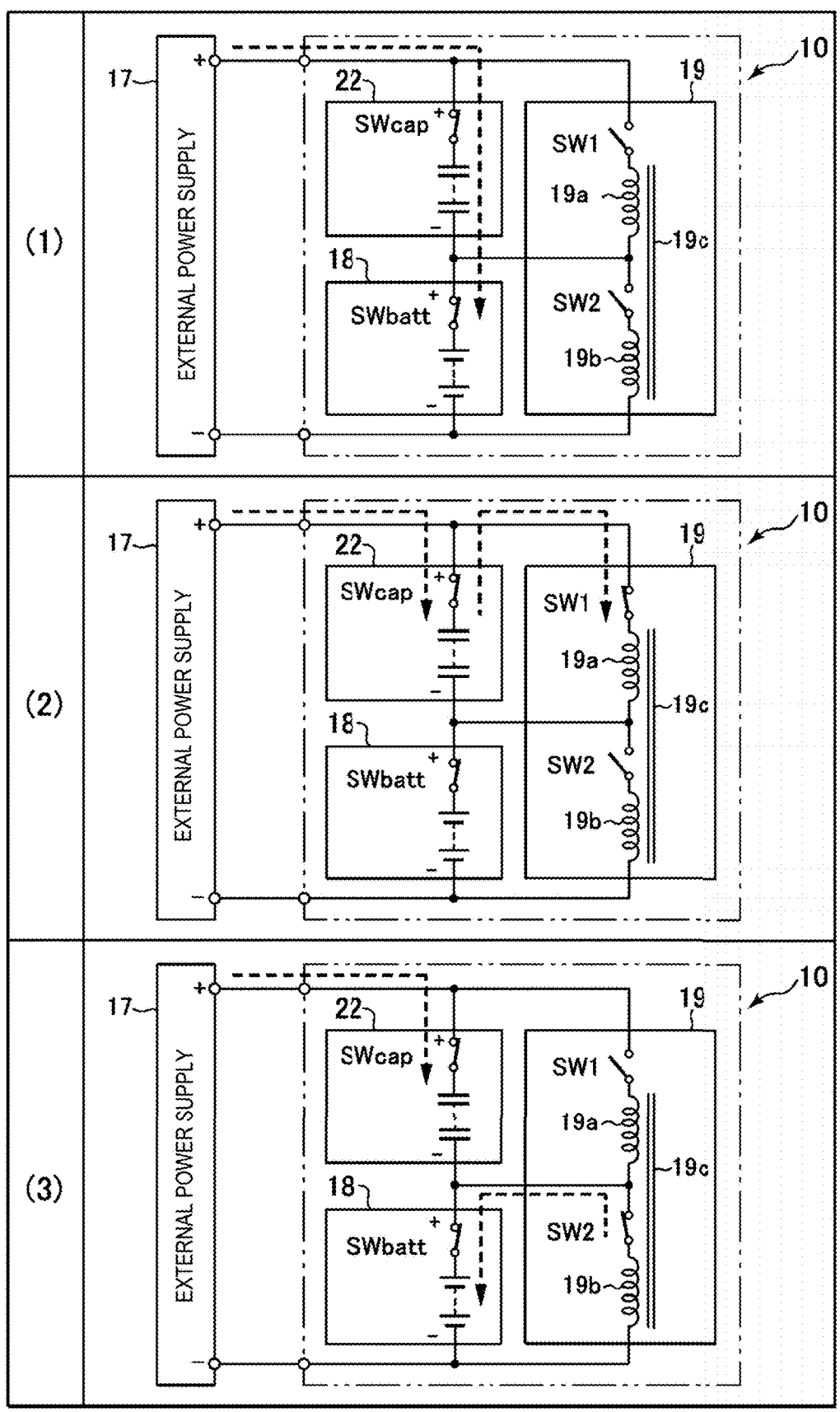
FIG. 9 includes diagrams illustrating open/closed positions of electrical switches and a current at each stage during the external charging executed by the vehicle drive system according to the embodiment of the present disclosure.

With reference to FIG. 8, at time t1, the switches SWbatt, SWcap are turned ON (closed states), and charging by the external power supply 17 is initiated (see stage (1) in FIG. 9). In this state, the battery 18 and the capacitor 22 are connected to the external power supply 17 while the charging circuit 19 is disconnected from the external power supply 17. As a result, the current supplied from the external power supply 17 flows into the capacitor 22 and the battery 18 (the currents Icap, Ibatt>0), and the capacitor 22 and the battery 18 are charged. In conjunction with this, the capacitor voltage Vcap and the battery voltage Vbatt are boosted. The electric charges storable in the capacitor 22 are smaller than the electric charges storable in the battery 18. Thus, the capacitor voltage Vcap is boosted faster than the battery voltage Vbatt.

Similar to step S13, the control circuit 24 calculates the states of the battery 18 and the capacitor 22 (S33). Then, the control circuit 24 determines the electrical energy of the capacitor 22 (S34). In this processing, the control circuit 24 determines whether the electrical energy of the capacitor 22 falls within a specified range that is appropriate for a released electric charge amount to the battery 18. More specifically, the control circuit 24 determines whether the capacitor voltage Vcap falls within a specified voltage range suited for the charging schedule. If the electrical energy of the capacitor 22 does not fall within the specified range (S34; No), the processing returns to the processing in step S31, and the control circuit 24 calculates the charging command again. On the other hand, if the electrical energy of the capacitor 22 falls within the specified range (S34; Yes), an appropriate amount of the discharged electric charges is stored in the capacitor 22. Thus, the control circuit 24 brings the switch SW1 into the closed state and brings the switch SW2 into the open state (S35) so as to discharge the capacitor 22 (see stage (2) in FIG. 9). In this way, the current is supplied to the coil 19*a*, and the magnetic energy is stored in the coil 19*a*.

With reference to FIG. 8, at time t2, the capacitor voltage Vcap is boosted to a specified voltage value, and the switch SW1 is turned ON (see stage (2) in FIG. 9). In this state, the current from the external power supply 17 flows into the coil 19*a*, and the electric charges stored in the capacitor 22 are discharged (the current Icap<0) and flow into the coil 19*a*. In this way, the magnetic energy is stored in the coil 19*a*. The capacitor 22 is discharged. However, because the current keeps being supplied from the external power supply 17, the capacitor voltage Vcap is hardly dropped. In addition, the current additionally flows into the battery 18 via the coil 19*a*. Thus, the battery voltage Vbatt is boosted. As an overall tendency, the input voltage value Vin is increased with time.

Until a specified amount of the current flows into the coil 19*a* (until the specified magnetic energy is stored), the switch SW1 is maintained in the closed state (S36; No). On the other hand, if the amount of the current that flows into the coil 19*a* reaches a specified value (S36; Yes), the control circuit 24 brings the switch SW1 into the open state and brings the switch SW2 into the closed state (S37) so as to release the magnetic energy stored in the coil 19*a* (see stage (3) in FIG. 9). The magnetic energy of the coil 19*a* is released via the coil 19*b*. That is, due to the magnetic energy of the coil 19*a*, an induced current is generated to the coil 19*a*. Then, due to the induced current generated to the coil 19*a* as a primary coil, the current is generated to the coil 19*b* as a secondary coil. Since this current flows through the closed circuit constructed of the coil 19*b* and the battery 18, the battery 18 is charged, and the battery voltage Vbatt is boosted. Meanwhile, the capacitor 22 is charged with the charge current from the external power supply 17, and the capacitor voltage Vcap is also boosted. As a result, the input voltage value Vin is increased with time.

With reference to FIG. 8, at time t3, the specified amount of the current flows into the coil 19a. Thus, the switch SW1 is turned OFF, and the switch SW2 is turned ON (see stage (3) in FIG. 9). In this state, the capacitor 22 is charged by the current from the external power supply 17, and the electrical energy stored in the coil 19a is released to charge the battery 18. In this way, the capacitor voltage Vcap and the battery voltage Vbatt are boosted.

While the battery voltage Vbatt is boosted, switch positions of the switches SW1, SW2 are maintained until the specified amount of the charge current flows into the connection point NO due to the magnetic energy of the coil 19a (S38; No). When a total inflow amount of the charge current to the connection point NO reaches the specified value (S38; Yes), the control circuit 24 determines whether charging of the battery 18 is completed (S39). In this processing, the control circuit 24 determines whether the battery voltage Vbatt reaches a specified charging termination threshold (for example, the full-charged voltage=48 V) or the SOC of the battery 18 reaches a specified value (for example, 100%).

If charging of the battery 18 is not completed (S39; No), the processing is shifted to step S33 again. That is, until charging of the battery 18 is completed, the processing in steps S33 to S39 is repeated (see the time t2 to t8 in FIG. 8), and the vehicle drive system 10 is switched between the states at stage (2) and stage (3) in FIG. 9. When charging of the battery 18 is completed (S39; Yes), the processing is shifted to the charging completion processing (S40 in FIG. 5). In the charging completion processing, the control circuit 24 executes processing to switch the switches SW1, SW2 to the open states, processing to send a charging completion signal to the external power supply 17, and the like. Then, the control circuit 24 terminates the external charging processing.

In FIG. 8, at the time t8, charging of the battery 18 is completed (that is, S39; Yes). As illustrated in FIG. 8, the input voltage value Vin is increased with time as similar to the battery voltage Vbatt, and reaches the charging termination threshold (for example, 120 V) at the time t8 according to the charging schedule. That is, both of the battery voltage Vbatt and the capacitor voltage Vcap reach the rated voltages (48V, 72V).

Figure 10:
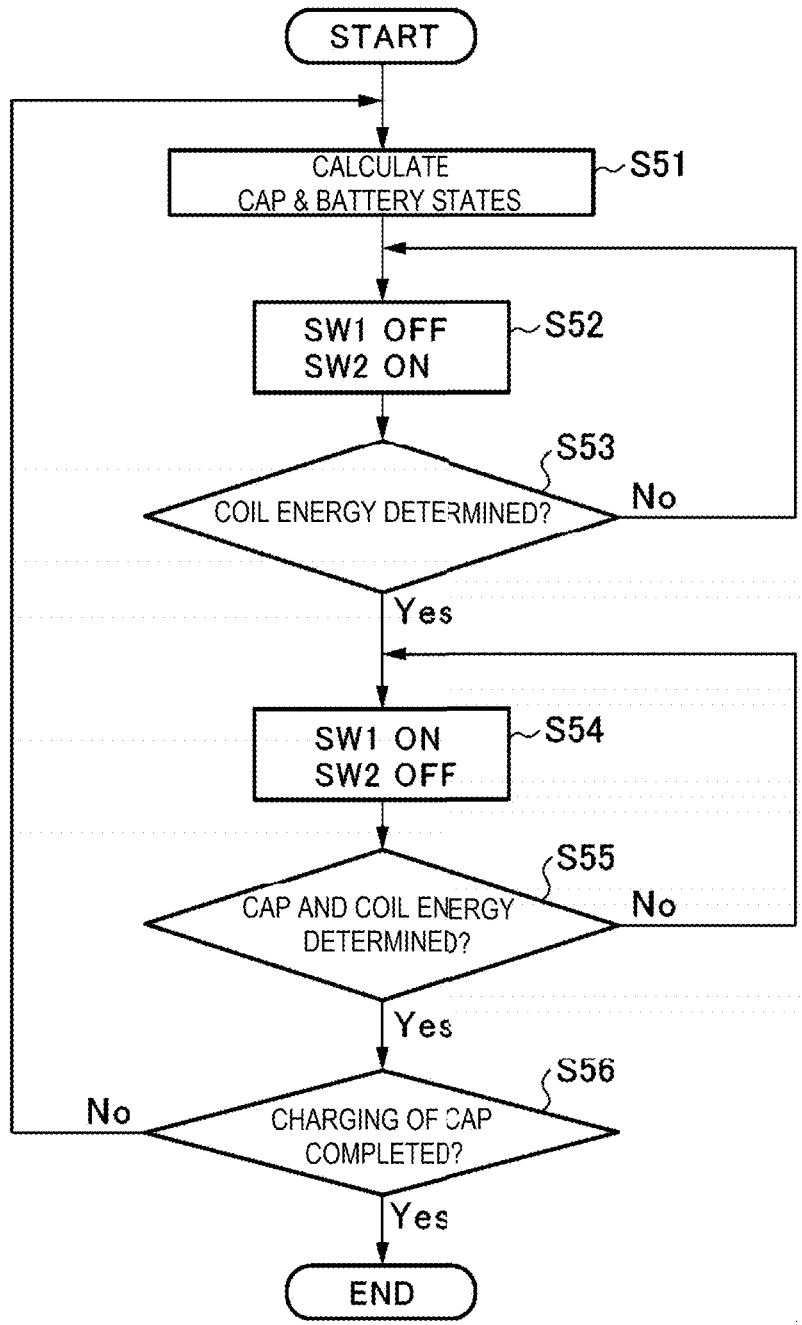
FIG. 10 is a flowchart of capacitor charging processing executed by the vehicle drive system according to the embodiment of the present disclosure.

Next, a description will be made on the capacitor charging processing in the external charging processing in this embodiment with reference to FIG. 10 to FIG. 12. FIG. 10 is a flowchart of the capacitor charging processing, FIG. 11 includes time charts illustrating the displacement of the current and the voltage during the capacitor charging processing, and FIG. 12 includes diagrams illustrating the open/closed positions of the electrical switches and the current at each stage during the capacitor charging processing.

In the information processing before charging (see FIG. 6), if the input voltage value Vin is lower than the specified voltage (S12; No), the capacitor charging processing S50 is executed. During the capacitor charging processing, the charging power is not yet supplied from the external power supply 17. In the capacitor charging processing, similar to step S13, the control circuit 24 calculates the states of the battery 18 and the capacitor 22 (S51). Next, the control circuit 24 brings the switch SW1 into the open state, and brings the switch SW2 into the closed state (S52). In this way, the current is supplied from the battery 18 to the coil 19b, and the magnetic energy is stored in the coil 19b (see stage (11) in FIG. 12).

Figure 11:
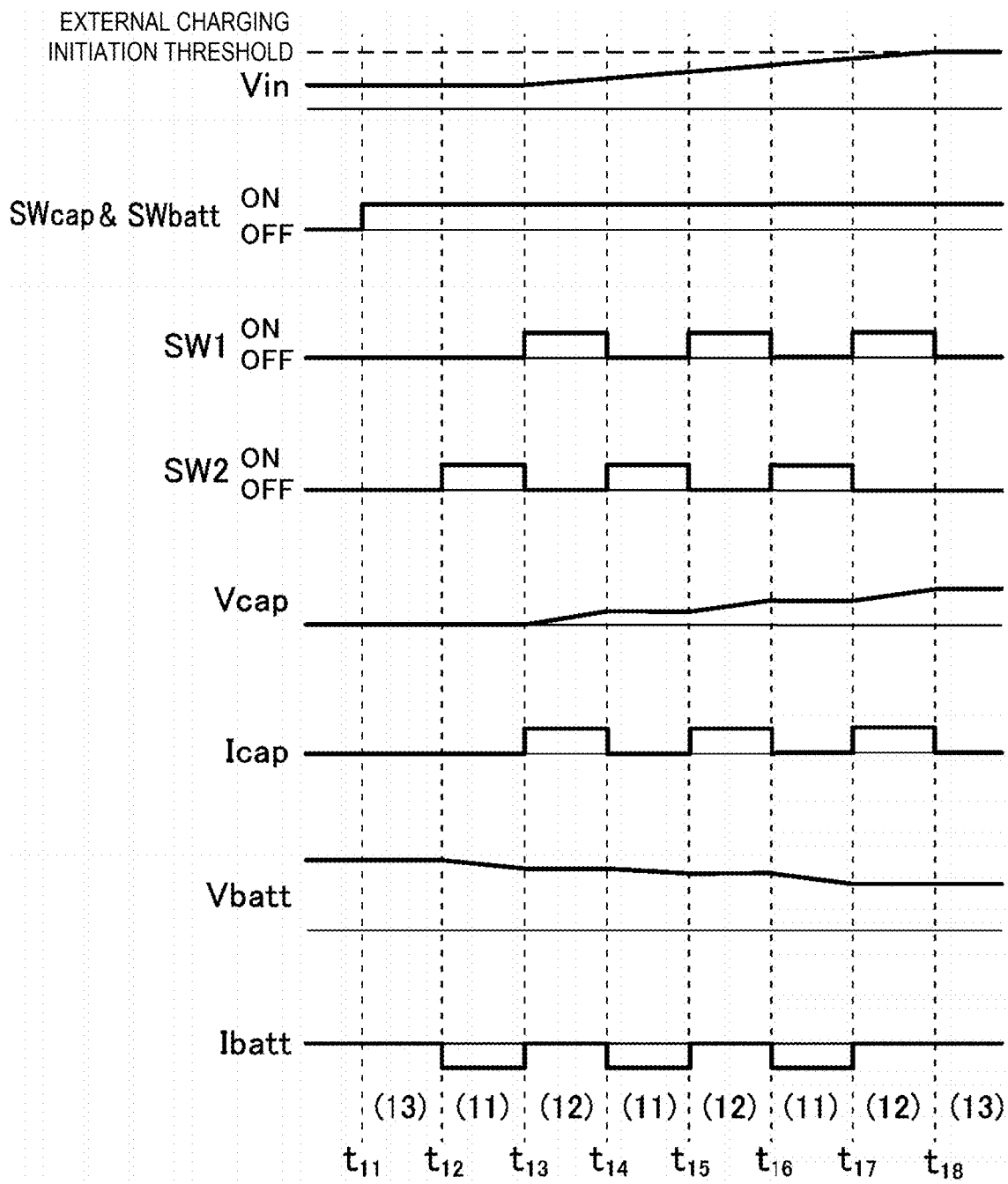
FIG. 11 includes time charts illustrating the displacement of the current and the voltage during the capacitor charging processing executed by the vehicle drive system according to the embodiment of the present disclosure.

With reference to FIG. 11, at time t11, it is detected that the switches SWbatt, SWcap are ON (the closed states) and that the input voltage value Vin is lower than the external charging initiation threshold. At time t12, charging of the capacitor 22 is initiated. Thus, in a state where the switch SW1 is OFF (the open state), the switch SW2 is turned ON (see stage (11) in FIG. 12). In this state, the current (Ibatt<0) output from the battery 18 flows into the coil 19b. As a result, the battery voltage Vbatt is lowered. However, since a sufficient amount of the electric charges is stored in the battery 18, only a slight amount of the battery voltage Vbatt is dropped.

Until a specified amount of the current flows into the coil 19b (until the specified magnetic energy is stored), the switch SW2 is maintained in the closed state (S53; No). On the other hand, if the amount of the current that flows into the coil 19b reaches a specified value (S53; Yes), the control circuit 24 brings the switch SW1 into the closed state and brings the switch SW2 into the open state (S54) so as to release the magnetic energy stored in the coil 19b (see stage (12) in FIG. 12). The magnetic energy of the coil 19b is released via the coil 19a. That is, due to the magnetic energy of the coil 19b, the induced current is generated to the coil 19b. Then, due to the induced current generated to the coil 19b as the primary coil, the current is generated to the coil 19a as the secondary coil. Since this current flows through the closed circuit constructed of the coil 19a and the capacitor 22, the capacitor 22 is charged, and the capacitor voltage Vcap is boosted. Meanwhile, the battery current Ibatt becomes zero. Thus, the battery voltage Vbatt is not changed. As a result, the input voltage value Vin is increased with time.

With reference to FIG. 11, at time t13, the specified amount of the current flows into the coil 19b. Thus, the switch SW1 is turned ON, and the switch SW2 is turned OFF (see stage (12) in FIG. 12). In this state, the current from the coil 19a flows into the capacitor 22 (the current Icap>0), the capacitor 22 is charged. In this way, the capacitor voltage Vcap is boosted (the battery voltage Vbatt is not changed). As a result, the input voltage value Vin is increased.

While the capacitor voltage Vcap is boosted, the switch positions of the switches SW1, SW2 are maintained until the specified amount of the charge current flows into the capacitor 22 (S55; No). When a total inflow amount of the charge current to the capacitor 22 reaches the specified value (S55; Yes), the control circuit 24 determines whether charging of the capacitor 22 is completed (S56). In this processing, the control circuit 24 determines whether the capacitor voltage Vcap is sufficiently boosted, that is, the input voltage value Vin reaches the external charging initiation threshold.

If charging of the capacitor 22 is not completed (S56; No), the processing is shifted to step S51 again. That is, until charging of the capacitor 22 is completed, the processing in steps S51 to S56 is repeated (see the time t12 to t18 in FIG. 11), and the vehicle drive system 10 is switched between the states at stage (11) and stage (12) in FIG. 12. If charging of the capacitor 22 is completed (S56; Yes), the capacitor charging processing is terminated, and the processing returns to the information processing before charging S10 (FIG. 6). Thereafter, the external charging processing (FIG. 5) continues. Then, the charging processing S30 (FIG. 7) is executed after the vehicle relay processing S20. In the charging processing S30, when the external power supply 17 supplies the charge current, the vehicle drive system 10 is brought into the state at stage (13) in FIG. 12 (same as stage (1) in FIG. 9).

As described above, the capacitor charging processing is executed under a specified condition in the external charging processing. In addition to the external charging processing, the capacitor charging processing is also executed in the case where the capacitor 22 is discharged and the capacitor voltage is dropped during the travel of the vehicle 1, or the like. That is, before the power is supplied to the secondary drive motors 20, the capacitor charging processing is executed to maintain the capacitor voltage to be equal to or higher than the specified voltage.

Figure 13:
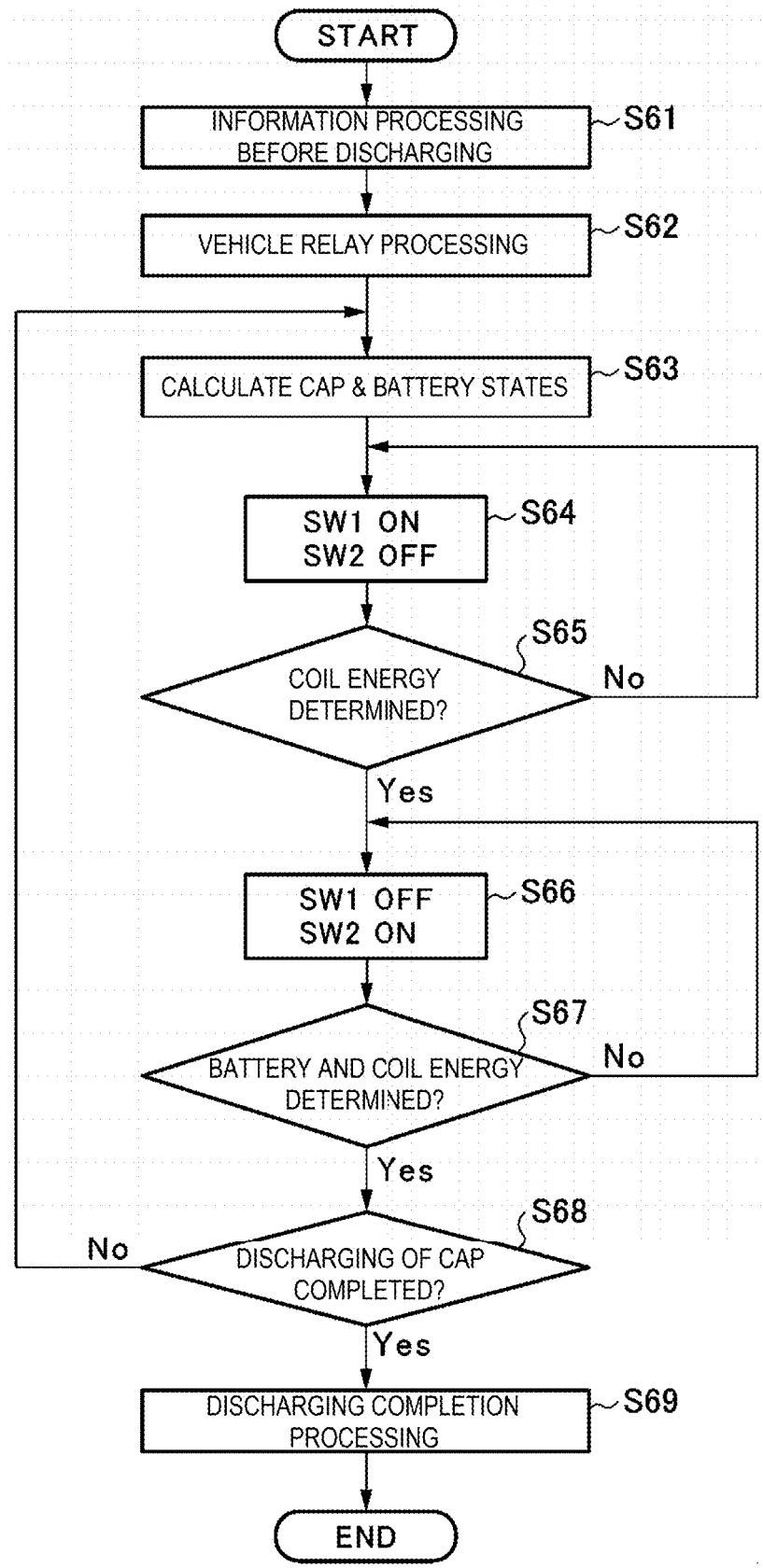
FIG. 13 is a flowchart of capacitor discharging processing executed by the vehicle drive system according to the embodiment of the present disclosure.

Next, a description will be made on capacitor discharging processing in this embodiment with reference to FIG. 13 to FIG. 15. FIG. 13 is a flowchart of the capacitor discharging processing, FIG. 14 includes time charts illustrating the displacement of the current and the voltage during the capacitor discharging processing, and FIG. 15 includes diagrams illustrating the open/closed positions of the electrical switches and the current at each stage during the capacitor discharging processing.

The capacitor discharging processing is executed to release the electric charges stored in the capacitor 22 to the battery 18. This processing is executed, for example, in order to discharge the capacitor 22 until the voltage thereof becomes the safe voltage at the time of replacing the capacitor 22 or to prevent the capacitor 22 from being charged more than necessary with the power regenerated by the secondary drive motors 20.

When the capacitor discharging processing is initiated, the control circuit 24 executes information processing before discharging (S61). In this processing, the battery voltage Vbatt, the capacitor voltage Vcap, the battery current Ibatt, the capacitor current Icap, the SOCs of the battery 18 and the capacitor 22, and the like are obtained (see S13). Next, the control circuit 24 executes the vehicle relay processing (S62). In this processing, the switches SW1, SW2 are set to the initial positions (the open positions).

Next, the control circuit 24 executes the discharging processing (S63 to S68). In the discharging processing, similar to step S13, the control circuit 24 calculates the states of the battery 18 and the capacitor 22 (S63). Next, the control circuit 24 brings the switch SW1 into the closed state, brings the switch SW2 into the open state (S64), releases the electric charges from the capacitor 22 to the coil 19*a*, and stores the magnetic energy in the coil 19*a* (see stage (21) in FIG. 15). As a result, the capacitor voltage Vcap is dropped.

Figure 14:
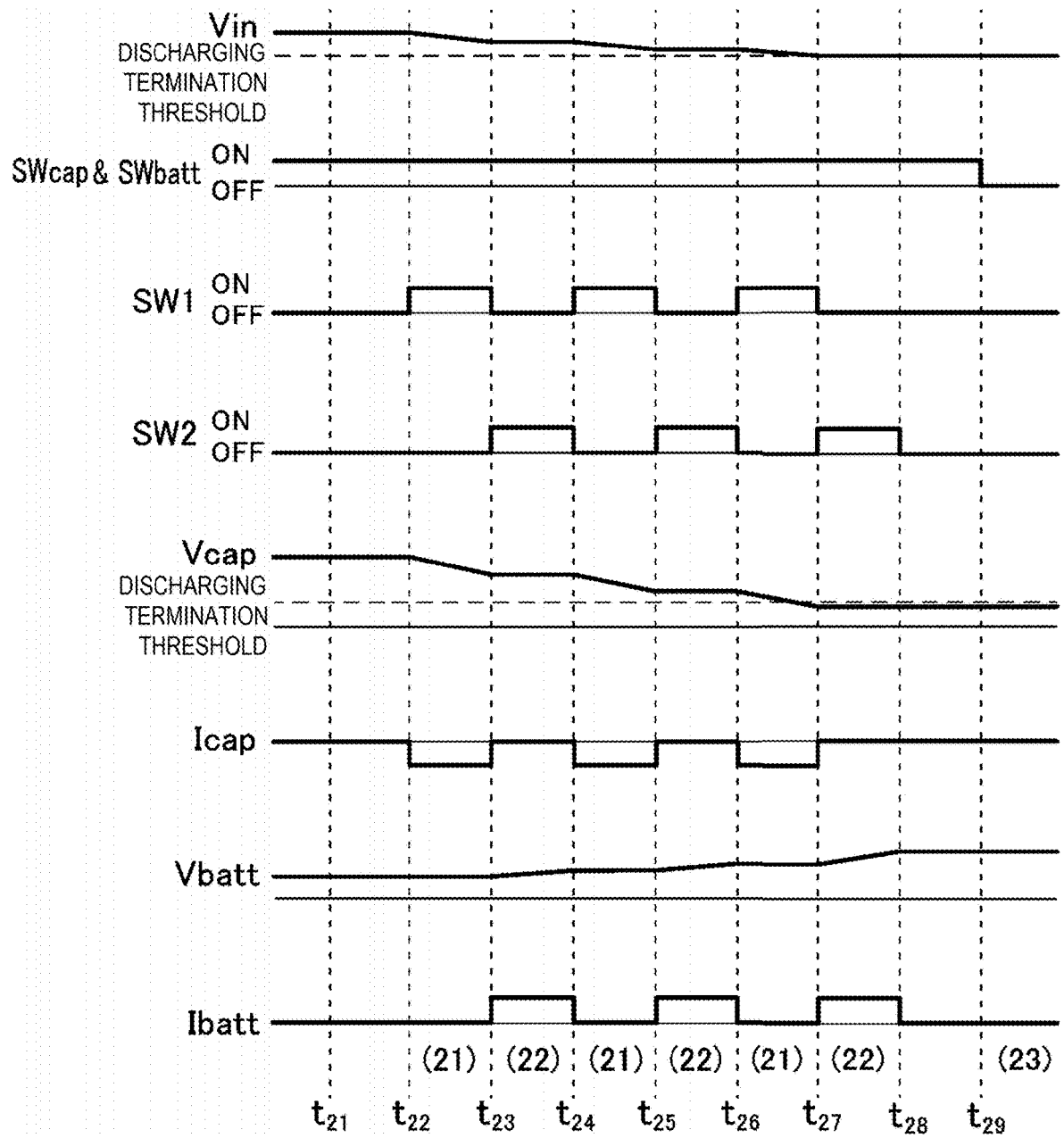
FIG. 14 includes time charts illustrating the displacement of the current and the voltage during the capacitor discharging processing executed by the vehicle drive system according to the embodiment of the present disclosure.
Figure 15:
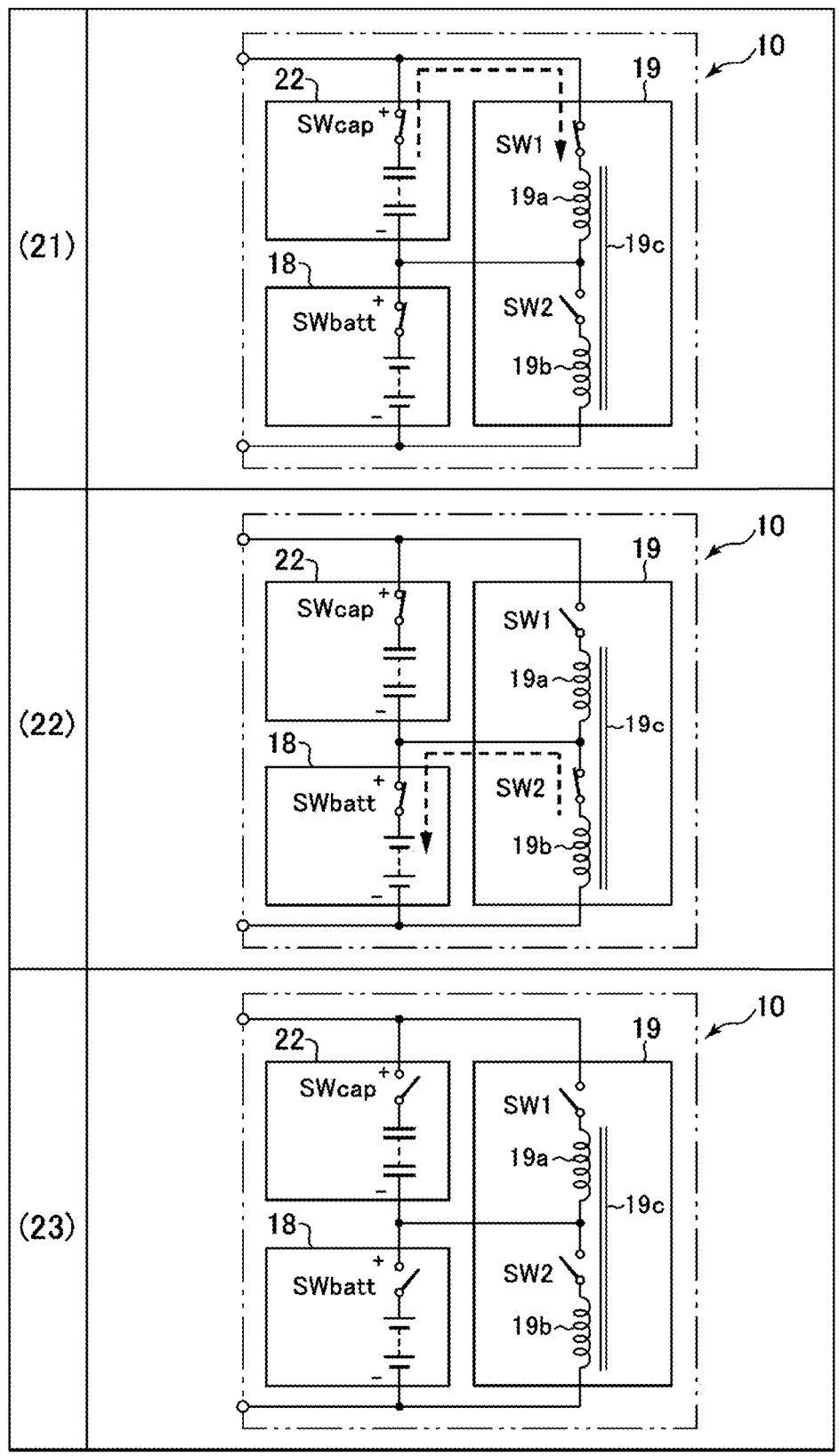
FIG. 15 includes diagrams illustrating the open/closed positions of the electrical switches and the current at each stage during the capacitor discharging processing executed by the vehicle drive system according to the embodiment of the present disclosure.

With reference to FIG. 14, at time t21, the capacitor voltage Vcap is equal to or higher than a specified voltage. At time t22, the switch SW1 is turned ON, and the switch SW2 is turned OFF (the open state) (see stage (21) in FIG. 15). In this state, the current (Icap<0) discharged from the capacitor 22 flows into the coil 19*a*. In this way, the magnetic energy is stored in the coil 19*a*.

Until the specified amount of the current flows into the coil 19*a* (until the specified magnetic energy is stored), the switch SW1 is maintained in the closed state (S65; No). On the other hand, if the amount of the current that flows into the coil 19*a* reaches the specified value (S65; Yes), the control circuit 24 brings the switch SW1 into the open state and brings the switch SW2 into the closed state (S66) so as to discharge the magnetic energy stored in the coil 19*a* (see stage (22) in FIG. 15). The magnetic energy of the coil 19*a* is released via the coil 19*b*. In this way, the current flows through the closed circuit constructed of the coil 19*b* and the battery 18, the battery 18 is thereby charged, and the battery voltage Vbatt is boosted. Meanwhile, the current Icap output from the capacitor 22 becomes zero. Thus, the capacitor voltage Vcap is not changed.

With reference to FIG. 14, at time t23, the specified amount of the current flows into the coil 19*a*. Thus, the switch SW1 is turned OFF, and the switch SW2 is turned ON (see stage (22) in FIG. 15). In this state, the current from the coil 19*b* flows into the battery 18 (the current Ibatt>0). In this way, the battery voltage Vbatt is slightly boosted (the capacitor voltage Vcap is not changed).

While the battery voltage Vbatt is boosted, the switch positions of the switches SW1, SW2 are maintained until the specified amount of the charge current flows into the connection point NO from the coil 19*b*(S67; No). When a total inflow amount of the charge current to the connection point NO reaches the specified value (S67; Yes), the control circuit 24 determines whether discharging of the capacitor is completed (S68). In this processing, the control circuit 24 determines whether the capacitor voltage Vcap is sufficiently dropped (that is, the capacitor voltage Vcap reaches a discharging termination threshold). In S68, the control circuit 24 may additionally determine whether the input voltage value Vin reaches the discharging termination threshold, which is set for the input voltage value Vin.

If discharging of the capacitor 22 is not completed (S68; No), the processing is shifted to step S61 again. That is, until discharging of the capacitor 22 is completed, the processing in steps S61 to S68 is repeated (see the time t22 to t28 in FIG. 14), and the vehicle drive system 10 is switched between the states at stage (21) and stage (22) in FIG. 15. On the other hand, if discharging of the capacitor is completed (S68; Yes), the capacitor discharging processing is terminated and proceeds to discharging completion processing (S69). In the discharging completion processing, the switches SW1, SW2 are brought into the open states, and the capacitor discharging processing is terminated. Here, stage (23) in FIG. 15 represents a standby state where the switches SWbatt, SWcap are turned OFF at time t29 for maintenance of the vehicle 1, or the like.

Hereinafter, a description will be made on operational effects of the vehicle drive system 10 according to the embodiment of the present disclosure.

According to this embodiment, the vehicle drive system 10 that is mounted on the vehicle 1 includes: the power supply 3 in which the rechargeable battery 18 and the rechargeable capacitor 22 are connected in series; the primary drive motor 16 (the first vehicle drive motor) to which the voltage of the battery 18 is provided; the secondary drive motors 20 (the second vehicle drive motors) to which the total voltage (Vin) of the battery 18 and the capacitor 22 is provided; the charging circuit 19 connected to the power supply 3; and the control circuit 24 that controls charging/discharging of the power supply 3 via the charging circuit 19. The charging circuit 19 includes: the coil 19*a* (the first coil); the coil 19*b* (the second coil); the iron core 19*c* that magnetically couples the coil 19*a* and the coil 19*b*; the switch SW1 (the first switch) for electrically connecting/disconnecting the coil 19*a* and the capacitor 22; and the switch SW2 (the second switch) for electrically connecting and disconnecting the coil 19*b* and the battery 18. The control circuit 24 is configured to operate the switch SW1 and the switch SW2 so as to control charging/discharging of the battery 18 and the capacitor 22.

In this embodiment that is configured as described above, the power supply 3 includes the series connection between the battery 18 and the capacitor 22, and also includes at least:

the first power line 5a connected to the capacitor 22; and the second power line 5b connected to the battery 18. The first power line 5a and the second power line 5b can provide the different power supply voltages. The secondary drive motors 20 are driven by the first power line 5a, and the primary drive motor 16 is driven by the second power line 5b. Just as described, in this embodiment, it is possible to supply the plural power supply voltages with the easy and simple configuration. In addition, in this embodiment, the power supply 3 is constructed of the series connection of the battery 18 and the capacitor 22. Thus, the charging circuit can have the simple configuration of the two electrical switches and the two coils (inductors). With opening/closing of these two electrical switches, the control circuit 24 can easily charge/discharge the electric charges between the battery 18 and the capacitor 22.

In this embodiment, preferably, the rated voltage (72 V) of the capacitor 22 is higher than the rated voltage (48 V) of the battery 18. In this embodiment that is configured as described above, in the case where the power supply 3 is charged by the external power supply 17 and the rated voltage of the battery 18 is lower than the lower limit voltage of the external power supply 17, the capacitor 22, the rated voltage of which is higher than that of the battery 18, is connected to the battery 18 in series. In this way, it is possible to easily maintain the input voltage value Vin of the vehicle 1 to be higher than the lower limit voltage.

In this embodiment, more specifically, the end of the capacitor 22 is connected to the positive electrode terminal of the battery 18, the first series circuit 19A of the coil 19a and the switch SW1 is connected in parallel with the capacitor 22, the second series circuit 19B of the coil 19b and the switch SW2 is connected in parallel with the battery 18, the first series circuit 19A and the second series circuit 19B are connected in series at the connection point N1, and the connection point N1 is connected to the positive electrode terminal of the battery 18.

In this embodiment, preferably, the control circuit 24 controls the charging circuit 19 such that the first stage (stage (2) in FIG. 9) at which the switch SW1 is brought into the closed state and the switch SW2 is brought into the open state (S35) so as to store some of the energy stored in the capacitor 22 in the coil 19a and the second stage (stage (3) in FIG. 9) at which the switch SW1 is brought into the open state and the switch SW2 is brought into the closed state (S37) so as to release the energy stored in the coil 19a to the battery 18 via the coil 19b and charge the battery 18 are repeated for plural times.

In this embodiment that is configured as described above, the electric charges of the capacitor 22 are released to the battery 18 via the charging circuit 19. In this way, the battery 18 can be charged. At this time, for example, the charging power is supplied from the external power supply 17 to the capacitor 22. In this way, the battery 18 and the power supply capacitor 22 can substantially simultaneously be charged by the external power supply 17.

Figure 12:
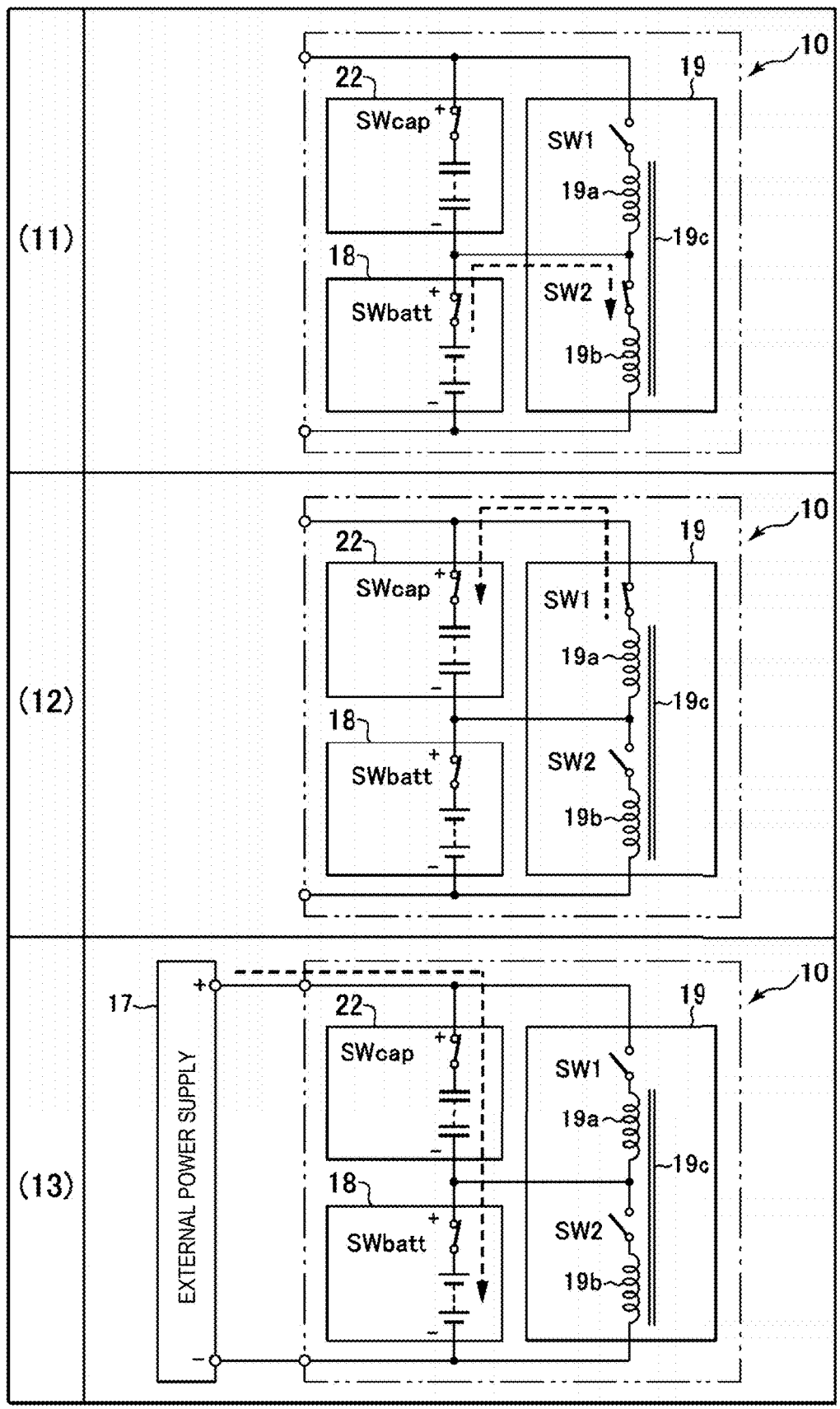
FIG. 12 includes diagrams illustrating the open/closed positions of the electrical switches and the current at each stage during the capacitor charging processing executed by the vehicle drive system according to the embodiment of the present disclosure.

In this embodiment, preferably, the control circuit 24 controls the charging circuit 19 such that the third stage (stage (11) in FIG. 12) at which the switch SW1 is brought into the open state and the switch SW2 is brought into the closed state (S52) so as to store some of the energy stored in the battery 18 in the coil 19b and the fourth stage (stage (12) in FIG. 12) at which the switch SW1 is brought into the closed state and the switch SW2 is brought into the open state (S54) so as to release the energy stored in the coil 19b to the capacitor 22 via the coil 19a and charge the capacitor 22 are repeated for plural times.

In this embodiment that is configured as described above, the electric charges of the battery 18 are released to the capacitor 22 via the charging circuit 19. In this way, the capacitor 22 can be charged.

In this embodiment, preferably, the capacitor 22 is configured that the amount of the electric charges storable therein is smaller than the amount of the electric charges storable in the battery 18. In this embodiment that is configured as described above, in the case where the capacitor 22 is charged by the battery 18, the total voltage of the battery 18 and the capacitor 22 is boosted. Thus, in the case where the total voltage is lower than the lower limit voltage of the external power supply 17, the external charging can be performed by boosting the total voltage.

Figure 16:
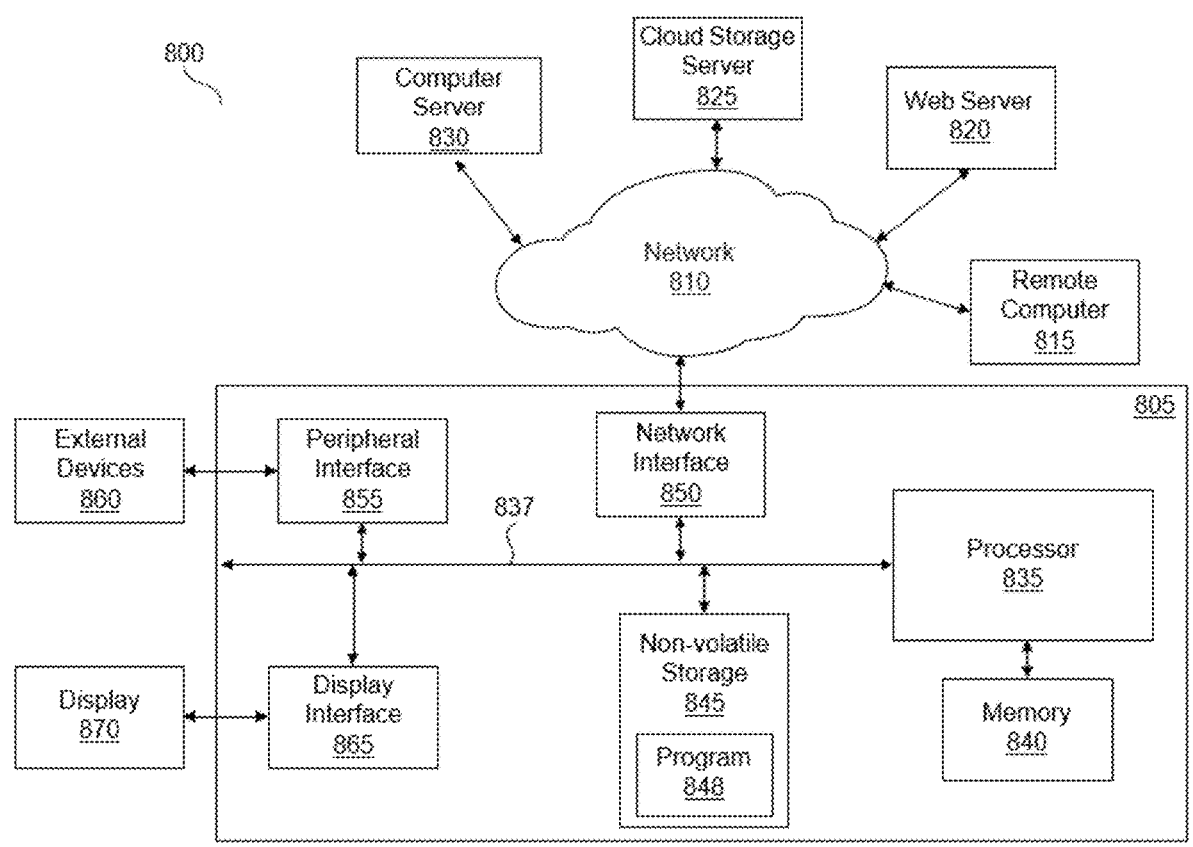
FIG. 16 is a circuit diagram of a controller used to control operations and processes as described herein.

FIG. 16 illustrates a block diagram of a computer that may implement the various control aspects of the embodiments described herein. The control aspects of the present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 16 is a functional block diagram illustrating a networked system 800 of one or more networked computers and servers. In an embodiment, the hardware and software environment illustrated in FIG. 16 may provide an exemplary platform for implementation of the software and/or methods according to the present disclosure. Referring to FIG. 16, a networked system 800 may include, but is not limited to, computer 805, network 810, remote computer 815, web server 820, cloud storage server 825 and computer server 830. In some embodiments, multiple instances of one or more of the functional blocks illustrated in FIG. 16 may be employed.

Additional detail of computer 805 is shown in FIG. 16. The functional blocks illustrated within computer 805 are provided only to establish exemplary functionality and are not intended to be exhaustive. And while details are not provided for remote computer 815, web server 820, cloud storage server 825 and computer server 830, these other computers and devices may include similar functionality to that shown for computer 805.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like. Memory 840 and non-volatile storage 845 may be computer-readable storage media. Memory 840 may include any suitable volatile storage devices such as Dynamic Random. Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

DESCRIPTION OF REFERENCE SIGNS AND NUMERALS

- 1: Vehicle
- 3: Power supply
- 10: Vehicle drive system
- 16: Primary drive motor (first vehicle drive motor)
- 17: External power supply
- 18: Battery
- 18*a*: Battery cell
- 19: Charging circuit
- 19*a*: Coil (first coil)
- 19*b*: Coil (second coil)
- 19*c*: Iron core
- 19A: First series circuit
- 19B: Second series circuit
- 20: Secondary drive motor (second vehicle drive motor)
- 22: Capacitor
- 24: Control circuit
- 28: Electrical load
- G: Body ground
- N0, N1: Connection point
- SWbatt, SWcap: Switch
- SW1, SW2: Switches (first and second switches)

The invention claimed is:

1. A vehicle drive system mounted on a vehicle, the vehicle drive system comprising:
   a power supply including a rechargeable battery and a capacitor that are connected in series;
   a first vehicle drive motor to which a total aggregate voltage of the rechargeable battery and the capacitor is provided;
   a second vehicle drive motor to which a voltage of the rechargeable battery is provided;
   a charging circuit connected to the power supply; and
   a control circuit that controls charging/discharging of the power supply via the charging circuit, wherein
   the charging circuit includes:
      a first coil, a second coil, an iron core that magnetically couples the first coil and the second coil, a first switch that electrically connects/disconnects the first coil and the capacitor, and a second switch that electrically connects/disconnects the second coil and the battery, wherein
   the control circuit is configured to respectively set switch states of the first switch and the second switch so as to control charging/discharging of the rechargeable battery and the capacitor.

2. The vehicle drive system according to claim 1, wherein a rated voltage of the capacitor is higher than a rated voltage of the rechargeable battery.

3. The vehicle drive system according to claim 1, wherein one end of the capacitor is connected to a positive electrode terminal of the rechargeable battery,
   a first series circuit of the first coil and the first switch is connected in parallel with the capacitor,
   a second series circuit of the second coil and the second switch is connected in parallel with the battery, and
   the first series circuit and the second series circuit are connected in series at a connection point, and the connection point is connected to the positive electrode terminal of the rechargeable battery.

4. The vehicle drive system according to claim 3, wherein the control circuit is configured to control the charging circuit to repeat a multi-stage charging operation plural times, wherein
   a first stage of the multi-stage charging operation sets the first switch to a closed state, and the second switch to an open state so as to store a portion of energy from the capacitor in the first coil, and
   a second stage of the multi-stage charging operation sets the first switch to the open state, and the second switch to the closed state so as to transfer energy stored in the first coil to the battery via the iron core and the second coil so as to charge the rechargeable battery.

5. The vehicle drive system according to claim 3, wherein the control circuit is configured to control the charging circuit to repeat additional stages of the multi-stage charging operation plural times, wherein the additional stages include
   a third stage that sets the first switch to the open state, and the second switch to the closed state so as to transfer some energy stored in the rechargeable battery to the second coil; and
   a fourth stage that sets the first switch to the closed state, and the second switch to the open state so as to transfer energy stored in the second coil to the capacitor via the first coil so as to charge the capacitor.

6. The vehicle drive system according to claim 1, wherein the capacitor is configured to store a smaller amount of electric charge than the rechargeable battery.

7. The vehicle drive system according to claim 2, wherein one end of the capacitor is connected to a positive electrode terminal of the rechargeable battery,
   a first series circuit of the first coil and the first switch is connected in parallel with the capacitor,
   a second series circuit of the second coil and the second switch is connected in parallel with the battery, and
   the first series circuit and the second series circuit are connected in series at a connection point, and the connection point is connected to the positive electrode terminal of the rechargeable battery.

8. The vehicle drive system according to claim 1, further comprising:
   the first vehicle drive motor being an electric motor and configured to generate drive power for primary drive wheels, wherein
   the first vehicle drive motor is provided on the vehicle, and arranged adjacent to the engine at a position behind the engine.

9. The vehicle drive system according to claim 8, wherein the battery is a power storage device that stores electrical energy that provides primary power to the first vehicle drive motor.

10. The vehicle drive system according to claim 1, wherein
the second vehicle drive motor and another second vehicle drive motor are provided for respective of two front wheels so as to generate drive power for the front wheels as secondary drive wheels.

11. The vehicle drive system according to claim 10, wherein the capacitor is a power storage device that supplies power to the second vehicle drive motor and the another second vehicle drive motor.

12. The vehicle drive system according to claim 8, wherein
drive motor are provided for respective of two front wheels so as to generate drive power for the front wheels as secondary drive wheels.

13. The vehicle drive system according to claim 12, wherein
the capacitor is a power storage device that supplies power to the second vehicle drive motor and the another second vehicle drive motor.

14. The vehicle drive system according to claim 1, further comprising:
a controller configured to control a vehicle engine, the first vehicle drive motor, and the second vehicle drive motor during execution of a motor driven mode of operation, and an internal combustion engine mode of operation.

15. The vehicle drive system according to claim 1, wherein
a battery voltage of the rechargeable battery being less than 50 VDC, and the total aggregate voltage being at least twice the battery voltage.

16. The vehicle drive system according to claim 15, wherein
total aggregate voltage being substantially 120 VDC, and the battery voltage being substantially 48 VDC.

17. The vehicle drive system according to claim 15, further comprising:
an inverter configured to covert at least one of the battery voltage and the total aggregate voltage to AC before being applied to one of the first vehicle drive motor and the second vehicle drive motor.

18. The vehicle drive system according to claim 1, wherein
the first power line supplies the battery voltage supplied from the battery to the first vehicle drive motor without using a DC/DC converter to change a voltage level.

19. The vehicle drive system according to claim 1, wherein
the second power line supplies the battery voltage supplied from the batter to the second vehicle drive motor without using a DC/DC converter to change a voltage level.

* * * * *